(12) United States Patent
Maeda et al.

(10) Patent No.: US 10,457,285 B2
(45) Date of Patent: Oct. 29, 2019

(54) VEHICLE CONTROL DEVICE FOR CONTROLLING INERTIA OPERATION OF VEHICLE

(71) Applicant: DENSO CORPORATION, Kariya, Aichi-pref. (JP)

(72) Inventors: Shigeru Maeda, Kariya (JP); Akira Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 228 days.

(21) Appl. No.: 15/553,960

(22) PCT Filed: Feb. 25, 2016

(86) PCT No.: PCT/JP2016/055621
§ 371 (c)(1),
(2) Date: Aug. 25, 2017

(87) PCT Pub. No.: WO2016/136874
PCT Pub. Date: Sep. 1, 2016

(65) Prior Publication Data
US 2018/0043892 A1    Feb. 15, 2018

(30) Foreign Application Priority Data
Jan. 15, 2016  (JP) ................................ 2016-006267

(51) Int. Cl.
*F16D 48/06* (2006.01)
*B60W 30/18* (2012.01)
(Continued)

(52) U.S. Cl.
CPC ......... *B60W 30/18072* (2013.01); *B60T 8/17* (2013.01); *B60W 10/02* (2013.01);
(Continued)

(58) Field of Classification Search
CPC ....... F16D 48/06; B60W 10/02; B60W 10/08; B60W 30/18072
See application file for complete search history.

(56) References Cited

U.S. PATENT DOCUMENTS

| 6,024,673 A | 2/2000 | Hayashi et al. |
| 2004/0014565 A1* | 1/2004 | Oshima .................. B60W 10/06 477/182 |

(Continued)

FOREIGN PATENT DOCUMENTS

| EP | 2 615 336 A1 | 7/2013 |
| JP | 2011-219087 A | 11/2011 |
| JP | 2014-136476 A | 7/2014 |

*Primary Examiner* — Edwin A Young
(74) *Attorney, Agent, or Firm* — Oliff PLC

(57) ABSTRACT

A vehicle control device turns off a clutch to put a vehicle into an inertia operation state in response to a predetermined executing condition being met, and turns on the clutch to terminate the inertia operation state in response to a predetermined terminating condition being met during the inertia operation. The vehicle control device includes a deceleration degree calculating device, a determination device, and an operation control device. The deceleration degree calculating device calculates an actual deceleration degree. The determination device determines whether the actual deceleration degree is greater than a threshold value defined on the basis of a deceleration degree of the vehicle in an accelerator-off and clutch-on state. The operation control device terminates or maintains the inertia operation depending on a condition of the actual deceleration degree.

35 Claims, 19 Drawing Sheets

(51) Int. Cl.
*B60W 10/02* (2006.01)
*B60T 8/17* (2006.01)
(52) U.S. Cl.
CPC ....... *B60W 30/18127* (2013.01); *F16D 48/06* (2013.01); *B60W 2030/1809* (2013.01); *B60W 2030/18081* (2013.01); *B60W 2520/10* (2013.01); *B60W 2520/105* (2013.01); *B60W 2710/021* (2013.01); *F16D 2500/1045* (2013.01); *F16D 2500/10412* (2013.01); *F16D 2500/1107* (2013.01); *F16D 2500/3109* (2013.01); *F16D 2500/3112* (2013.01); *F16D 2500/3144* (2013.01); *F16D 2500/31426* (2013.01); *F16D 2500/31433* (2013.01); *F16D 2500/31446* (2013.01); *F16D 2500/5085* (2013.01); *F16D 2500/50224* (2013.01); *F16D 2500/7041* (2013.01); *Y02T 10/76* (2013.01)

(56) References Cited

U.S. PATENT DOCUMENTS

| | | | |
|---|---|---|---|
| 2014/0156171 A1* | 6/2014 | Kono | B60W 10/02 701/103 |
| 2014/0336907 A1* | 11/2014 | Mori | F02N 11/084 701/112 |
| 2015/0274168 A1 | 10/2015 | Kuroki et al. | |
| 2016/0017825 A1 | 1/2016 | Maeda et al. | |

* cited by examiner (a) DOWNHILL SLOPE (FACTOR CAUSING DECREASE IN DECELERATION)

(b) UPHILL SLOPE (FACTOR CAUSING INCREASE IN DECELERATION)

VEHICLE CONTROL DEVICE FOR CONTROLLING INERTIA OPERATION OF VEHICLE

CROSS-REFERENCE TO RELATED APPLICATION

This application is based on and claims the benefit of priority from earlier Japanese Patent Application Nos. 2015-34999 filed Feb. 25, 2015 and 2016-6267 filed Jan. 15, 2016 the description of which are incorporated herein by reference.

BACKGROUND OF THE INVENTION

Technical Field

The present disclosure relates to a vehicle control device. More particularly, the present disclosure relates to a control device that controls the inertia operation of a vehicle.

Background Art

In recent years, techniques related to inertia operation of a vehicle have been developed. More specifically, techniques for putting a vehicle into an inertia operation state by putting a clutch device provided between an engine and a transmission into a shut-off state while an accelerator is off during the operation of the vehicle have been put to practical use in order to improve the fuel efficiency or the like. For example, various techniques related to the inertia operation have been proposed by JP 2011-219087 A (Patent Literature 1) or the like.

CITATION LIST

Patent Literature

Patent Literature 1: JP 2011-219087 A

In the conventional techniques, once the brake or accelerator operation is performed by a driver during the inertia operation of a vehicle, the inertia operation state is immediately terminated, and the vehicle is restored to its normal operation state. In this case, the switch from a clutch-off state to a clutch-on state occurs at the time of terminating the inertia operation, which can lead to, for example, the occurrence of a deceleration shock due to a change in the deceleration degree of the vehicle that happens in conjunction with the switch. If the inertia operation state is terminated against the driver's will, the resulting effect of improving the fuel efficiency may not be as significant as expected. Furthermore, the vehicle drivability is liable to be affected by the connection and disconnection (on and off) of the clutch device that frequently occur in conjunction with the start and end of the inertia operation.

Similarly, in a case where the inertia operation is started while the vehicle is in its normal operation state, the switch from the clutch-on state to the clutch-off state occurs at the time of starting the inertia operation, which can lead to, for example, the occurrence of a deceleration shock due to a change in the deceleration degree of the vehicle that happens in conjunction with the switch.

In a case where the vehicle is decelerated, the deceleration that occurs in the vehicle varies in accordance with the on/off state of the clutch device and the state of fuel injection in the vehicle deceleration state. In this case, since the state of fuel consumption is affected in a manner that depends on the region in which the inertia operation is performed, this point should also be further considered.

Hence it is desired to provide a vehicle control device capable of realizing appropriate inertia operation control.

For ease of understanding, in the following description, components corresponding to those of the embodiments of the present disclosure are appropriately denoted by reference signs using brackets or the like. However, the present disclosure is not limited to the specific components denoted using the brackets or the like.

A vehicle control device according to the present disclosure is applied to a vehicle including an engine configured to serve as a motive power source and a clutch device provided on a power transmission path leading to an output shaft of the engine. The vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during the inertia operation.

The vehicle control device is characterized by including: a deceleration degree calculating means configured to calculate an actual deceleration degree (A1) that is a deceleration degree of the vehicle in a vehicle deceleration state during the inertia operation; a determination means configured to determine whether the actual deceleration degree calculated by the deceleration degree calculating means is greater than a threshold value (B1) defined on the basis of a deceleration degree of the vehicle in such a state that no accelerator operation is performed and the clutch device is connected; and an operation control means configured to terminate the inertia operation if the actual deceleration degree is determined to be greater than the threshold value, and maintain the inertia operation if the actual deceleration degree is determined to be less than the threshold value. Note that this configuration corresponds to "Y1" of FIG. 14.

Assuming that the vehicle is put into the clutch connection state while the vehicle is decelerated in its inertia operation state (clutch shut-off state), the deceleration degree of the vehicle changes. Specifically, since the deceleration occurs due to the drag torque (what is called engine braking) of the engine in the clutch connection state, the deceleration degree in the clutch connection state is considered to be greater than that in the clutch shut-off state. Therefore, in a case where the inertia operation is terminated and turned into the non-inertia operation, it is preferable that the deceleration difference between the clutch shut-off state and the clutch connection state be considered.

In this regard, according to the above configuration, the actual deceleration degree (A1) of the vehicle in the vehicle deceleration state during the inertia operation (clutch shut-off) is compared with the threshold value (B1) defined on the basis of the deceleration degree of the vehicle in the accelerator-off and clutch connection state, and the inertia operation is terminated if the actual deceleration degree is greater than the threshold value. In this case, the actual deceleration degree commensurate with the clutch connection state occurs at the time of the shift to the clutch connection state for the termination of the inertia operation, and the deceleration behavior of the vehicle corresponding to a deceleration request from a driver is obtained. If the actual deceleration degree is less than the threshold value, the inertia operation is maintained. In this case, it is possible to prevent the inertia operation from being turned on and off (switched) frequently, and expect an improvement in the fuel efficiency and an improvement in the drivability. As a result, appropriate inertia operation control can be realized.

The threshold value (B1) defined on the basis of the deceleration degree of the vehicle in the accelerator-off and clutch connection state is, for example, a value on a clutch-on property XB of FIG. 2. The upper side of the property XB in FIG. 2 is a deceleration region that is realized by the execution of fuel injection during the clutch-on state. Specifically, the upper side of the property XB is a region in which the deceleration decreases due to the combustion torque of the fuel that overcomes the engine braking while the vehicle is decelerated. The lower side of the property XB is a deceleration region that is realized by the brake operation during the clutch-on state. In this regard, according to the above configuration, during the inertia operation, the inertia operation is terminated on the condition that the actual deceleration degree of the vehicle increases to reach the threshold value on the property XB. Therefore, a desired deceleration is obtained without the need for fuel injection at the time of terminating the inertia operation, and the fuel consumption can be reduced.

The vehicle control device is also characterized by including: a deceleration degree calculating means configured to calculate an actual deceleration degree (A2) that is a deceleration degree of the vehicle in a vehicle deceleration state during the non-inertia operation; a determination means configured to determine whether the actual deceleration degree calculated by the deceleration degree calculating means is greater than a threshold value (B2) defined on the basis of a deceleration degree of the vehicle in such a state that no accelerator operation is performed and the clutch device is shut off; and an operation control means configured to start the inertia operation if the actual deceleration degree is determined to be greater than the threshold value, and maintain the non-inertia operation if the actual deceleration degree is determined to be less than the threshold value. Note that this configuration corresponds to "Y2" of FIG. 14.

In a case where the vehicle starts to decelerate in its non-inertia operation state (clutch connection state), and the deceleration degree increases to some extent, the vehicle is put into a deceleration state similar to that in the clutch shut-off state. In consideration of this point, according to the above configuration, the actual deceleration degree (A2) of the vehicle in the vehicle deceleration state during the non-inertia operation (clutch connection) is compared with the threshold value (B2) defined on the basis of the deceleration degree of the vehicle in the accelerator-off and clutch shut-off state, and the inertia operation is started if the actual deceleration degree is greater than the threshold value. In this case, the actual deceleration degree commensurate with the clutch shut-off state occurs at the time of the shift to the clutch shut-off state for the inertia operation, and the deceleration behavior of the vehicle corresponding to a deceleration request from a driver is obtained. If the actual deceleration is less than the threshold value, the non-inertia operation is maintained. In this case, it is possible to prevent the inertia operation from being turned on and off (switched) frequently, and expect an improvement in the fuel efficiency and an improvement in the drivability. As a result, as mentioned previously, appropriate inertia operation control can be realized.

The threshold value (B2) defined on the basis of the deceleration degree of the vehicle in the accelerator-off and clutch shut-off state is, for example, a value on a clutch-off property XA of FIG. 2. Assuming that the clutch is on, this value corresponds to the deceleration that is realized by the execution of fuel injection. Specifically, this value is the deceleration of a region in which the deceleration decreases due to the combustion torque of the fuel that overcomes the engine braking in the clutch-on state. In this regard, according to the above configuration, during the non-inertia operation, the inertia operation is started on the condition that the actual deceleration degree of the vehicle increases to reach the threshold value on the property XA. Therefore, a desired deceleration is obtained without the need for fuel injection at the time of starting the inertia operation, and the fuel consumption can be reduced.

The vehicle control device is also characterized by including: a first deceleration degree calculating means configured to calculate a first actual deceleration degree (A1) that is a deceleration degree of the vehicle in a vehicle deceleration state during the inertia operation; a first determination means configured to determine whether the first actual deceleration degree calculated by the first deceleration degree calculating means is greater than a clutch-on threshold value (B1) defined on the basis of a deceleration degree of the vehicle in such a state that no accelerator operation is performed and the clutch device is connected; a first operation control means configured to terminate the inertia operation if the first actual deceleration degree is determined to be greater than the clutch-on threshold value, and maintain the inertia operation if the first actual deceleration degree is determined to be less than the clutch-on threshold value; a second deceleration degree calculating means configured to calculate a second actual deceleration degree (A2) that is a deceleration degree of the vehicle in a vehicle deceleration state during non-inertia operation; a second determination means configured to determine whether the second actual deceleration degree calculated by the second deceleration degree calculating means is greater than a clutch-off threshold value (B2) defined on the basis of a deceleration degree of the vehicle in such a state that no accelerator operation is performed and the clutch device is shut off; and a second operation control means configured to start the inertia operation if the second actual deceleration degree is determined to be greater than the clutch-off threshold value, and maintain the non-inertia operation if the second actual deceleration degree is determined to be less than the clutch-off threshold value.

In this case, in particular, the clutch-on threshold value (B1) is preferably calculated as a value having a larger deceleration degree than the clutch-off threshold value (B2). The above configuration is associated with the state shifts Y1 and Y2 of FIG. 14.

According to the above configuration, as mentioned previously, it is possible to prevent the inertia operation from being turned on and off (switched) frequently, and expect an improvement in the fuel efficiency and an improvement in the drivability. As a result, appropriate inertia operation control can be realized.

The vehicle control device is also characterized by including: a deceleration degree calculating means configured to calculate an actual deceleration degree (A3) that is a deceleration degree of the vehicle in a vehicle deceleration state during the inertia operation; a determination means configured to determine whether the actual deceleration degree calculated by the deceleration degree calculating means is less than a threshold value (B3) defined on the basis of a deceleration degree of the vehicle in such a state that no accelerator operation is performed and the clutch device is shut off; and an operation control means configured to terminate the inertia operation if the actual deceleration degree is determined to be less than the threshold value, and maintain the inertia operation if the actual deceleration degree is determined to be greater than the threshold value. Note that this configuration corresponds to "Y3" of FIG. 14.

In a case where the vehicle is decelerated in its inertia operation state (clutch shut-off state), and the deceleration degree of the vehicle decreases to some extent, the deceleration degree can hardly be realized in the clutch shut-off state. In consideration of this point, according to the above configuration, the actual deceleration degree (A3) of the vehicle in the vehicle deceleration state during the inertia operation (clutch shut-off) is compared with the threshold value (B3) defined on the basis of the deceleration degree of the vehicle in the accelerator-off and clutch shut-off state, and the inertia operation is terminated if the actual deceleration degree is less than the threshold value. In this case, the actual deceleration degree commensurate with the clutch connection state occurs at the time of the shift to the clutch connection state for the termination of the inertia operation, and the deceleration behavior of the vehicle corresponding to a deceleration request from a driver is obtained. If the actual deceleration is greater than the threshold value, the inertia operation is maintained. In this case, it is possible to prevent the inertia operation from being turned on and off (switched) frequently, and expect an improvement in the fuel efficiency and an improvement in the drivability. As a result, as mentioned previously, appropriate inertia operation control can be realized.

The vehicle control device is also characterized by including: a deceleration degree calculating means configured to calculate an actual deceleration degree (A4) that is a deceleration degree of the vehicle in a vehicle deceleration state during the non-inertia operation; a determination means configured to determine whether the actual deceleration degree calculated by the deceleration degree calculating means is less than a threshold value (B4) defined on the basis of a deceleration degree of the vehicle in such a state that no accelerator operation is performed and the clutch device is connected; and an operation control means configured to start the inertia operation if the actual deceleration degree is determined to be less than the threshold value, and maintain the non-inertia operation if the actual deceleration degree is determined to be greater than the threshold value. Note that this configuration corresponds to "Y4" of FIG. 14.

In a case where the vehicle is decelerated in its non-inertia operation state (clutch connection state), and the deceleration degree of the vehicle decreases to some extent, the vehicle is put into a deceleration state similar to that in the clutch shut-off state. In consideration of this point, according to the above configuration, the actual deceleration degree (A4) of the vehicle in the vehicle deceleration state during the non-inertia operation (clutch connection) is compared with the threshold value (B4) defined on the basis of the deceleration degree of the vehicle in the accelerator-off and clutch connection state, and the inertia operation is started if the actual deceleration degree is less than the threshold value. In this case, the actual deceleration degree commensurate with the clutch shut-off state occurs at the time of the shift to the clutch shut-off state for the inertia operation, and the deceleration behavior of the vehicle corresponding to a deceleration request from a driver is obtained. If the actual deceleration is greater than the threshold value, the non-inertia operation is maintained. In this case, it is possible to prevent the inertia operation from being turned on and off (switched) frequently, and expect an improvement in the fuel efficiency and an improvement in the drivability. As a result, as mentioned previously, appropriate inertia operation control can be realized.

The vehicle control device is also characterized by including: a first deceleration degree calculating means configured to calculate a first actual deceleration degree (A3) that is a deceleration degree of the vehicle in a vehicle deceleration state during the inertia operation; a first determination means configured to determine whether the first actual deceleration degree calculated by the first deceleration degree calculating means is less than a clutch-off threshold value (B3) defined on the basis of a deceleration degree of the vehicle in such a state that no accelerator operation is performed and the clutch device is shut off; a first operation control means configured to terminate the inertia operation if the first actual deceleration degree is determined to be less than the clutch-off threshold value, and maintain the inertia operation if the first actual deceleration degree is determined to be greater than the clutch-off threshold value; a second deceleration degree calculating means configured to calculate a second actual deceleration degree (A4) that is a deceleration degree of the vehicle in a vehicle deceleration state during non-inertia operation; a second determination means configured to determine whether the second actual deceleration degree calculated by the second deceleration degree calculating means is less than a clutch-on threshold value (B4) defined on the basis of a deceleration degree of the vehicle in such a state that no accelerator operation is performed and the clutch device is connected; and a second operation control means configured to start the inertia operation if the second actual deceleration degree is determined to be less than the clutch-on threshold value, and maintain the non-inertia operation if the second actual deceleration degree is determined to be greater than the clutch-on threshold value.

In this case, in particular, the clutch-off threshold value (B3) is preferably calculated as a value having a smaller deceleration degree than the clutch-on threshold value (B4). The above configuration is associated with the state shifts Y3 and Y4 of FIG. 14.

According to the above configuration, as mentioned previously, it is possible to prevent the inertia operation from being turned on and off (switched) frequently, and expect an improvement in the fuel efficiency and an improvement in the drivability. As a result, appropriate inertia operation control can be realized.

The vehicle control device is also characterized by including: a deceleration degree calculating means configured to calculate an actual deceleration degree (A1 to A4) that is a deceleration degree of the vehicle in a vehicle deceleration state; a first determination means configured to define an inertia operation region between a clutch-on property value (XB) and a clutch-off property value (XA), and determine to start the inertia operation when the actual deceleration degree calculated by the deceleration degree calculating means changes from the outside to the inside of the inertia operation region (in the case of Y2 and Y4), the clutch-on property value being defined on the basis of a deceleration degree of the vehicle in such a state that no accelerator operation is performed and the clutch device is connected, the clutch-off property value being defined on the basis of a deceleration degree of the vehicle in such a state that no accelerator operation is performed and the clutch device is shut off; and a second determination means configured to determine to terminate the inertia operation when the actual deceleration degree calculated by the deceleration degree calculating means changes from the inside to the outside of the inertia operation region (in the case of Y1 and Y3).

According to the above configuration, as mentioned previously, appropriate inertia operation control can be realized in both cases where the state shift occurs so that the deceleration degree of the vehicle enters the inertia operation region, and where the state shift occurs so that the deceleration degree of the vehicle leaves the inertia operation region.

DETAILED DESCRIPTION OF THE PREFERRED EMBODIMENTS

First Embodiment

Hereinafter, embodiments of the present disclosure will be described on the basis of the drawings. In the present embodiment, a vehicle equipped with an engine that serves as a motive power source is configured to selectively perform normal operation in which the vehicle runs while a clutch is in a power transmission state and inertia operation (coasting operation) in which the vehicle runs while the clutch is in a power shut-off state.

Figure 1:
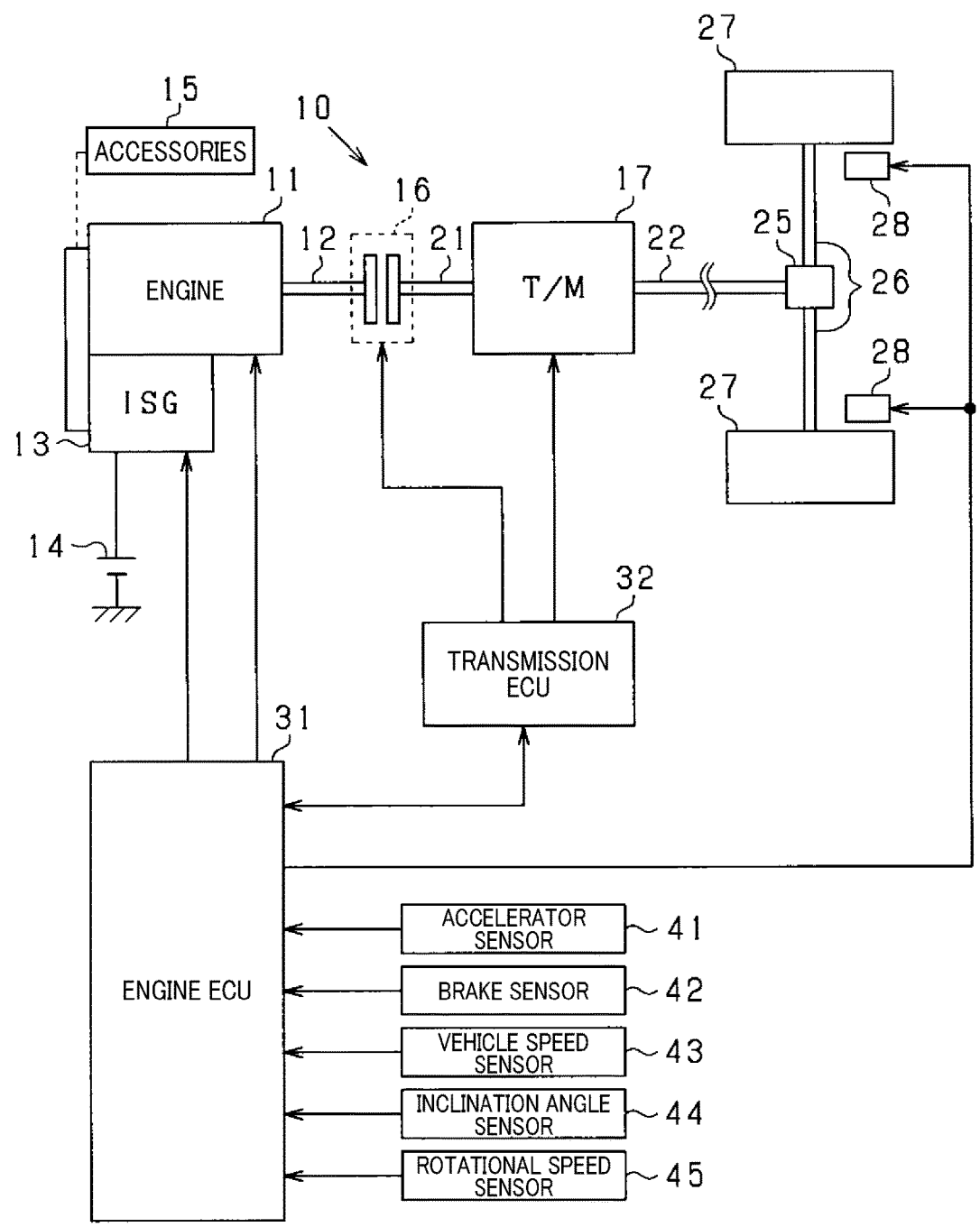
FIG. 1 is a configuration diagram illustrating a schematic vehicle control system.

In a vehicle 10 illustrated in FIG. 1, an engine 11 is a multicylinder internal combustion engine that is driven by the burning of fuel such as gasoline and diesel fuel, and appropriately includes a fuel injection valve, an ignition device, and the like, as is well known in the art. An integrated starter generator 13 (ISG) that serves as an electricity generator is integrally provided on the engine 11, and a rotary shaft of the ISG 13 is coupled to an engine output shaft 12 by a belt or the like, so that they can drive each other. In this case, the rotary shaft of the ISG 13 is rotated by the rotation of the engine output shaft 12, and the engine output shaft 12 is rotated by the rotation of the rotary shaft of the ISG 13. In other words, the ISG 13 includes an electricity generating function for generating electricity (regenerative electric power) with the aid of the rotation of the engine output shaft 12 and a power output function for applying the rotational force to the engine output shaft 12. When the engine is started, the initial rotation (cranking rotation) is applied to the engine 11 with the help of the rotation of the ISG 13.

An in-vehicle battery 14 is electrically connected to the ISG 13. In this case, the ISG 13 is driven in response to a power supply from the battery 14, and the battery 14 is charged with the electric power generated by the ISG 13. The electric power of the battery 14 is used for driving various in-vehicle electric loads.

In addition to the ISG 13, accessories 15 such as a water pump and a fuel pump are mounted in the vehicle 10 as driven devices that are driven by the rotation of the engine output shaft 12. Additionally, an air conditioning compressor may be included as one of the driven devices. Examples of driven devices include a driven device directly connected to the engine output shaft 12 and a driven device that is alternately coupled to and uncoupled from the engine output shaft 12 by a clutch mechanism as well as a driven device drivingly coupled to the engine 11 by a belt or the like.

A transmission 17 is coupled to the engine output shaft 12 via a clutch device 16 having a power transmission function. The clutch device 16 is, for example, a friction clutch, and includes a pair of clutch mechanisms having a circular disc (e.g., flywheel) located close to the engine 11 and connected to the engine output shaft 12 and a circular disc (e.g., clutch disc) located close to the transmission 17 and connected to a transmission input shaft 21. Once the two circular discs of the clutch device 16 are brought into contact with each other, the vehicle 10 is put into the power transmission state (clutch connection state) in which power is transmitted between the engine 11 and the transmission 17. Once the two circular discs are separated from each other, the vehicle 10 is put into the power shut-off state (clutch shut-off state) in which the transmission of power between the engine 11 and the transmission 17 is shut off. The clutch device 16 according to the present embodiment is configured as an automatic clutch that switches between the clutch connection state and the clutch shut-off state using an actuator such as a motor. Note that the clutch device 16 may be configured to be provided inside the transmission 17.

The transmission 17 is, for example, a stepless transmission (continuously variable transmission (CVT)) or a multistage transmission having a plurality of gear stages. The transmission 17 converts the power of the engine 11 input from the transmission input shaft 21 using the gear ratio that depends on the vehicle speed or engine rotational speed, and outputs the converted power to a transmission output shaft 22.

Wheels 27 are coupled to the transmission output shaft 22 via a differential gear 25 and a drive shaft 26 (vehicle drive shaft). Each of the wheels 27 is provided with a brake device 28 that is driven by a hydraulic circuit (not illustrated) or the like to apply brake force to the wheel 27. The brake device 28 adjusts the brake force for each wheel 27 in accordance with the pressure of a master cylinder (not illustrated) that transmits force on a brake pedal to hydraulic oil.

The present system also includes, as in-vehicle control means, an engine ECU 31 that controls the operation state of the engine 11 and a transmission ECU 32 that controls the clutch device 16 and the transmission 17. Both of the ECUs 31 and 32 are well-known electronic control devices including microcomputers or the like, and appropriately control the engine 11, the transmission 17, and the like based on detection results or the like of various sensors provided in the present system. The ECUs 31 and 32 are communicably connected to each other so that control signals, data signals, and the like can be shared between the ECUs 31 and 32. In the configuration of the present embodiment, the two ECUs 31 and 32 are provided, and the engine ECU 31 constitutes the "vehicle control device". However, the present disclosure is not limited to this configuration, and two or more ECUs may constitute the vehicle control device.

Examples of sensors include an accelerator sensor 41, a brake sensor 42, a vehicle speed sensor 43, an inclination angle sensor 44, a rotational speed sensor 45, and the like. The accelerator sensor 41 detects the amount of pressing operation (amount of accelerator operation) on an accelerator pedal that serves as an accelerator operation member. The brake sensor 42 detects the amount of pressing operation (amount of brake operation) on the brake pedal that serves as a brake operation member. The vehicle speed sensor 43 detects the vehicle speed. The inclination angle sensor 44 detects the inclination angle of a road surface on which the vehicle 10 is running. The rotational speed sensor 45 detects the engine rotational speed. Detection signals of the respective sensors are sequentially input to the engine ECU 31. In addition, the present system is provided with a voltage sensor that detects a battery voltage, load sensors (an air flow meter and an intake pressure sensor) that detect engine loads, a coolant temperature sensor, an outside air temperature sensor, an atmospheric pressure sensor, and the like, which are not illustrated.

Based on the detection results or the like of the various sensors, the engine ECU 31 performs various types of engine control such as fuel injection amount control by the fuel injection valve and ignition control by the ignition device, control for engine starting, engine torque assist, and electricity generation by the ISG 13, and brake control by the brake device 28. The transmission ECU 32 performs connection/disconnection control for the clutch device 16 and gear shift control for the transmission 17 based on the detection results or the like of the various sensors.

The vehicle 10 according to the present embodiment has the function of putting the clutch device 16 into the shut-off state so that the vehicle 10 performs the inertia operation while the vehicle 10 is running due to the operation of the engine 11. The execution of the inertia operation enables an improvement in the fuel efficiency. The engine ECU 31 has the function of controlling the inertia operation, and performs the switch between a normal operation state and an inertia operation state. In the normal operation state, the engine 11 and the clutch device 16 are respectively put into the operation state and the connection state (clutch-on state), whereby the operation of the vehicle 10 is performed. In the inertia operation state, the engine 11 and the clutch device 16 are respectively put into the stop state and the shut-off state (clutch-off state), whereby the inertia operation of the vehicle 10 is performed.

Instead of the configuration in which the engine 11 and the clutch device 16 are respectively put into the stop state and the shut-off state for the inertia operation state, the configuration in which the engine 11 and the clutch device 16 are respectively put into the operation state (e.g., idle state) and the shut-off state for the inertia operation state may be employed. In this case, in the clutch-off state, the engine 11 preferably remains in the operation state in preparation for the next reacceleration or the like, during which an idle rotation state is maintained in order to save the fuel.

In this case, the engine ECU 31 puts the clutch device 16 into the shut-off state (off state) to put the vehicle 10 into the inertia operation state in response to predetermined executing conditions including accelerator and brake conditions being met during the normal operation of the vehicle 10. The executing conditions preferably include, for example, a condition that the engine rotational speed is stable at a predetermined value or more (e.g., idle rotational speed or more), a condition that the vehicle speed is within a predetermined range (e.g., 20 to 120 km/h), a condition that the incline of a road surface (inclination) is within a predetermined range, and a condition that the drive amount of an electric load is equal to or less than a predetermined value. The engine ECU 31 also puts the clutch device 16 into the connection state (on state) to terminate the inertia operation state in response to predetermined terminating conditions including accelerator and brake conditions being met during the inertia operation of the vehicle 10. At this time, the inertia operation state is preferably terminated when the executing conditions for the inertia operation are not met.

Next, the configuration related to the conditions for the switch from the inertia operation to the normal operation (non-inertia operation) will be described in detail.

When the vehicle 10 performs the inertia operation in the accelerator-off and clutch-off state, the vehicle speed decreases relatively gradually. At this time, the deceleration [m/s2] has a value that depends on the vehicle speed, and exhibits a deceleration property indicated by a clutch-off property XA of FIG. 2, for example. Such a state is a gradual deceleration state in which no engine braking occurs and the vehicle speed decreases mainly due to vehicle running resistance. Note that deceleration [m/s2] is represented as a negative acceleration [m/s2] in FIG. 2.

Figure 2:
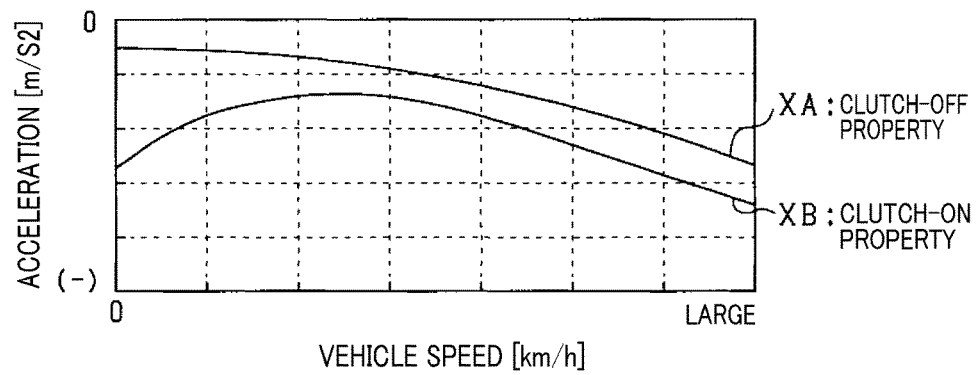
FIG. 2 is a diagram illustrating deceleration properties that depend on the vehicle speed.

In contrast, when the vehicle 10 performs the normal operation in the accelerator-off and clutch-on state, the deceleration [m/s2] is greater than that during the inertia operation, and exhibits a deceleration property indicated by a clutch-on property XB of FIG. 2, for example. In other words, during the accelerator-off vehicle operation, a driver feels the deceleration of the property XA if the clutch is off, and feels the deceleration of the property XB if the clutch is on. Note that the properties of FIG. 2 are determined on the premise that a CVT is used as the transmission 17 and in consideration of the gear ratio of the CVT that is switched in accordance with the vehicle speed. The clutch-off property XA corresponds to "clutch-off correlation data", and the clutch-on property XB corresponds to "clutch-on correlation data".

The upper side of the property XB in FIG. 2 is a deceleration region that is realized by the execution of fuel injection during the clutch-on state. Specifically, the upper side of the property XB is a region in which the deceleration decreases due to the combustion torque of the fuel that overcomes the engine braking while the vehicle 10 is decelerated. The lower side of the property XB is a deceleration region that is realized by the brake operation during the clutch-on state. Assuming that the clutch is on, the deceleration indicated by the property XA corresponds to the deceleration that is realized by the execution of fuel injection, that is, the deceleration of a region in which the deceleration decreases due to the combustion torque of the fuel that overcomes the engine braking.

Suppose the shift from the clutch-off state to the clutch-on state occurs to terminate the inertia operation. For example, the brake operation is performed by the driver, and the deceleration occurs in the vehicle 10 accordingly. Then, if the deceleration increases to the property XB, the deceleration commensurate with the clutch-on state occurs in response to the shift to the clutch-on state, and the deceleration behavior of the vehicle 10 corresponding to a deceleration request from the driver is obtained. In this case, the deceleration is preferably generated so as to be dependent on the driver's brake operation until the deceleration of the property XB is obtained. Specifically, even though the brake operation is performed by the driver, the inertia operation state is preferably maintained until the shift to the state of generating the deceleration of the property XB. Then, the vehicle 10 is preferably put into the clutch-on state to terminate the inertia operation once the deceleration of the property XB is obtained.

Suppose the vehicle is decelerated (hereinafter referred to as a vehicle deceleration state) during the non-inertia operation. In a region having a smaller deceleration than the property XB, a desired deceleration (deceleration smaller than that of the property XB) is obtained through the execution of fuel injection. During the inertia operation, however, the inertia operation is continued until the deceleration reaches the property XB. In this case, in a region between the properties XA and XB, a desired deceleration is obtained by the driver's brake operation, and no fuel injection is performed for realizing the deceleration in the region between the properties XA and XB. Consequently, the fuel consumption can be reduced.

According to the present embodiment, the inertia operation control by the engine ECU 31 includes calculating the actual deceleration degree in the vehicle deceleration state during the inertia operation. The actual deceleration degree is the deceleration degree of the vehicle that occurs in conjunction with the driver's brake operation. The inertia operation control by the engine ECU 31 also includes determining whether the actual deceleration degree is greater than a threshold value (threshold value that is based on the property XB, corresponding to a first threshold value) defined as the deceleration degree of the vehicle in the accelerator-off and clutch-on state. The inertia operation control by the engine ECU 31 further includes terminating the inertia operation if the actual deceleration degree is determined to be greater than the threshold value, and maintaining the inertia operation if the actual deceleration degree is determined to be less than the threshold value.

Next, the configuration related to the conditions for the switch from the normal operation (non-inertia operation) to the inertia operation will be described in detail.

In a case where the amount of accelerator operation decreases during the normal operation of the vehicle 10 in the accelerator-on and clutch-on state, the vehicle 10 in its acceleration/constant-speed state is put into the deceleration state while the amount of accelerator operation decreases (during the period until the accelerator is turned off). Specifically, the amount of accelerator operation includes an operation amount range in which the acceleration or constant speed is caused and an operation amount range in which the deceleration is caused in accordance with the vehicle speed. While the amount of accelerator operation decreases, the vehicle 10 in its acceleration/constant-speed state is put into the deceleration state once the amount of accelerator operation reaches a boundary threshold value between the two ranges.

Suppose the shift from the clutch-on state to the clutch-off state occurs to cause the shift to inertia operation. The deceleration occurs in the vehicle 10 in conjunction with a decrease in the amount of accelerator operation. Then, if the deceleration increases to the property XA, the deceleration commensurate with the clutch-off state occurs in response to the shift to the clutch-off state, and the deceleration behavior of the vehicle 10 corresponding to a deceleration request from the driver is obtained. In this case, even though the driver moderates the accelerator operation, the inertia operation is preferably not started until the deceleration of the property XA is obtained, and the inertia operation is preferably started once the deceleration of the property XA is obtained.

With regard to the fuel injection, at the time that the deceleration increases to the property XA, the fuel injection is required in the clutch-on state and not required in the clutch-off state in order to realize the deceleration at that time. Therefore, the inertia operation is started once the deceleration increases to the property XA, whereby the combustion torque does not need to be generated in the engine 11, and the fuel consumption can be reduced.

According to the present embodiment, the inertia operation control by the engine ECU 31 includes calculating the actual deceleration degree in the vehicle deceleration state during the non-inertia operation. The actual deceleration degree is the deceleration degree of the vehicle that occurs in conjunction with a decrease in the driver's accelerator operation. The inertia operation control by the engine ECU 31 also includes determining whether the actual deceleration degree is greater than a threshold value (threshold value that is based on the property XA, corresponding to a second threshold value) defined as the deceleration degree of the vehicle in the accelerator-off and clutch-off state. The inertia operation control by the engine ECU 31 further includes starting the inertia operation if the actual deceleration degree is determined to be greater than the threshold value, and maintaining the non-inertia operation if the actual deceleration degree is determined to be less than the threshold value.

In the present embodiment, an actual deceleration [m/s2] that is the real deceleration of the vehicle is used as the "actual deceleration degree", and a threshold value [m/s2] of the deceleration is used as the "threshold value". As used herein, the deceleration is the absolute value of the acceleration, and a large deceleration means that the vehicle is decelerated to a large extent.

Figure 3:
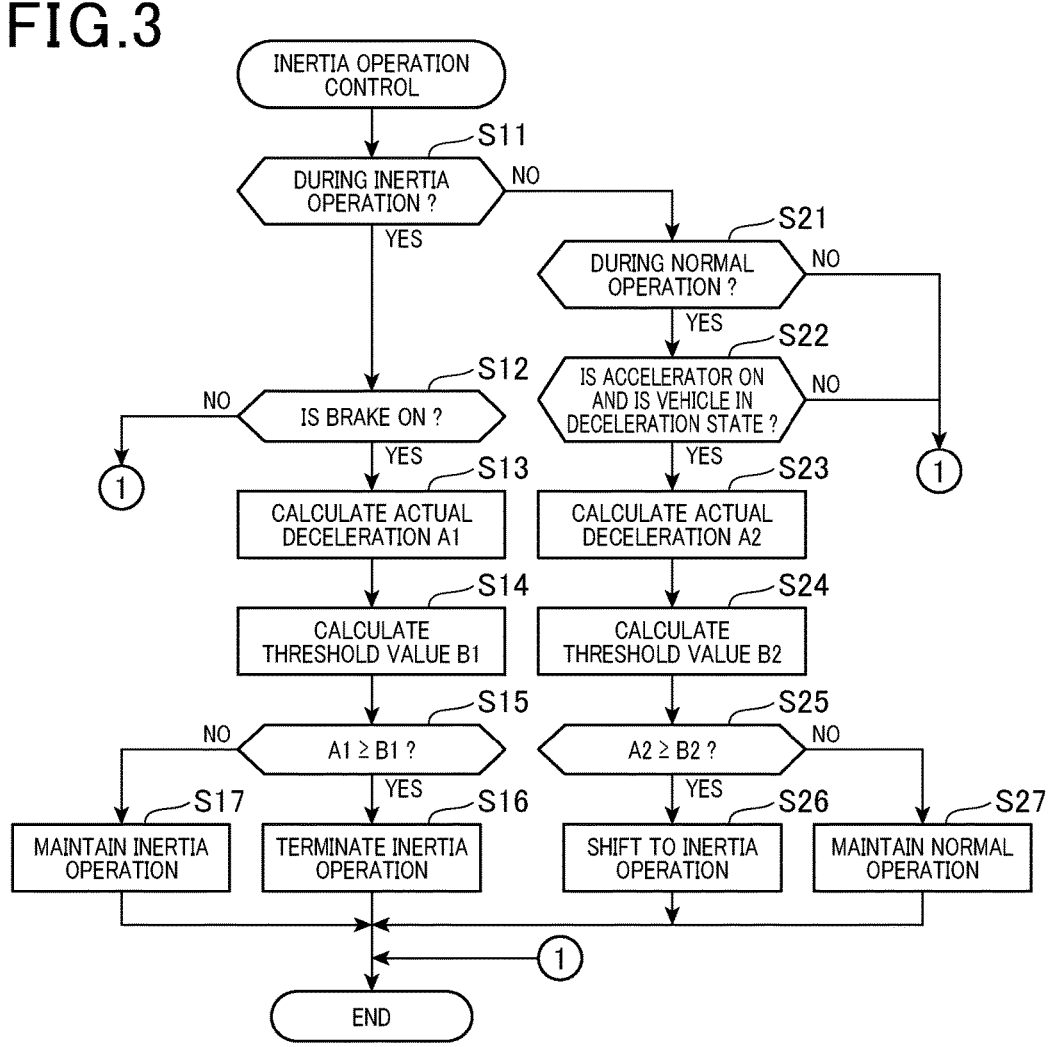
FIG. 3 is a flowchart illustrating a procedure for an inertia operation control process.

FIG. 3 is a flowchart illustrating a procedure for the inertia operation control process. This process is repeatedly performed by the engine ECU 31 at predetermined intervals.

In step S11 of FIG. 3, it is determined whether the vehicle 10 is currently in the clutch-off inertia operation state. The process advances to step S12 in the case of YES, and advances to step S21 in the case of NO. In step S12, it is determined whether the brake is on. It is determined that the brake is on if the amount of brake operation detected by the brake sensor 42 is greater than zero. The process advances to step S13 in the case of YES in step S12.

Figure 4:
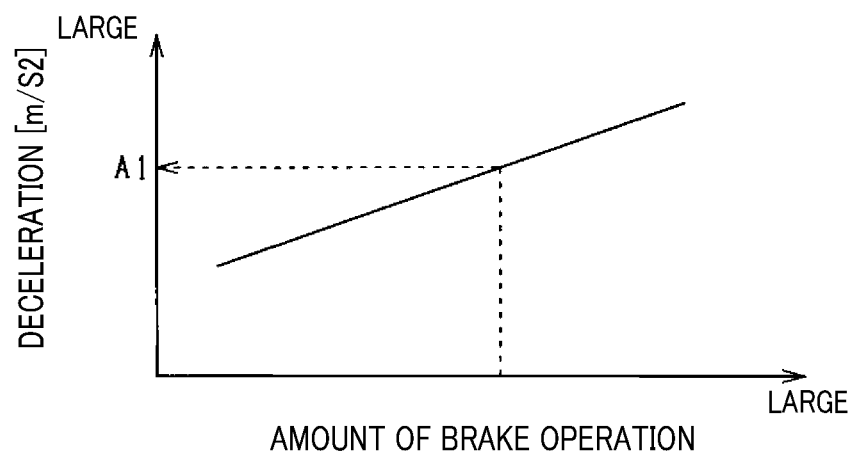
FIG. 4 is a diagram illustrating the relation between the amount of brake operation and the deceleration.

In step S13, an actual deceleration A1 [m/s2] of the vehicle that occurs in conjunction with the driver's brake operation is calculated. More specifically, the actual deceleration A1 is calculated using the relation of FIG. 4. In FIG. 4, the relation between the amount of brake operation and the deceleration is defined, and the actual deceleration A1 is calculated on the basis of the amount of brake operation (amount of pressing the brake pedal) detected by the brake sensor 42. In this case, the value that is calculated as the actual deceleration A1 increases as the amount of brake operation increases.

Figure 5:
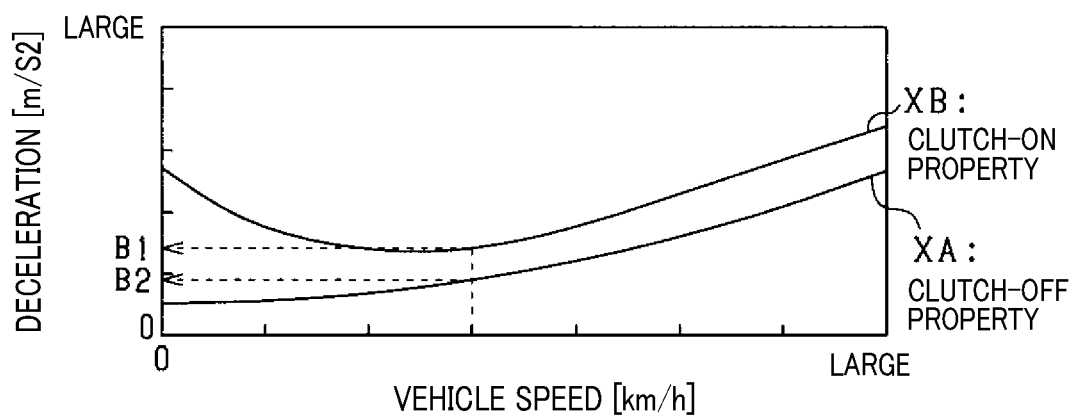
FIG. 5 is a diagram illustrating deceleration properties that depend on the vehicle speed.

In subsequent step S14, a threshold value B1 [m/s2] defined as the deceleration of the vehicle in the accelerator-off and clutch-on state (non-coast deceleration state) is calculated. More specifically, the threshold value B1 is calculated using correlation data illustrated in FIG. 5. FIG. 5 is a diagram illustrating the properties XA and XB similar to those in FIG. 2, and the vertical axis represents the "deceleration" for convenience. In this case, the clutch-on property XB in FIG. 5 corresponds to the correlation data indicating the correlation between the vehicle deceleration and the vehicle speed in the accelerator-off and clutch-on state. Using the correlation data, the threshold value B1 is calculated on the basis of the current vehicle speed. Note that the threshold value B1 is calculated as a value having a larger deceleration than a threshold value B2 to be described later.

In step S15, it is determined whether the actual deceleration A1 is equal to or greater than the threshold value B1. The process advances to step S16 if A1≥B1 is satisfied, and advances to step S17 if A1<B1 is satisfied. In step S16, it is determined to cause the shift to the clutch-on state, that is, terminate the inertia operation state. In step S17, it is determined to maintain the clutch-off state, that is, maintain the inertia operation state.

In step S21, it is determined whether the vehicle 10 is currently in the clutch-on normal operation state. The process advances to step S22 in the case of YES. In step S22, it is determined whether the accelerator is on and the vehicle is in the deceleration state. It is determined that the accelerator is on if the amount of accelerator operation detected by the accelerator sensor 41 is greater than zero. It is determined that the vehicle is in the deceleration state if the vehicle speed detected by the vehicle speed sensor 43 decreases. The process advances to step S23 in the case of YES in step S22.

Figure 6:
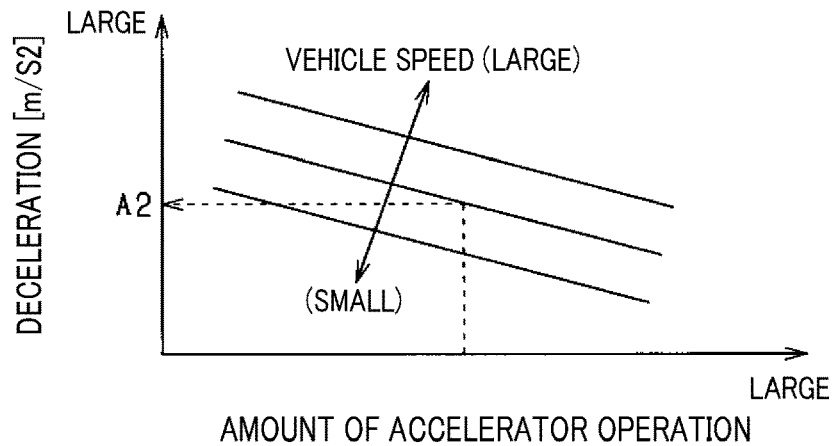
FIG. 6 is a diagram illustrating the relation between the amount of accelerator operation, the vehicle speed, and the deceleration.

In step S23, an actual deceleration A2 [m/s2] of the vehicle that occurs in conjunction with a decrease in the amount of accelerator operation by the driver is calculated. More specifically, the actual deceleration A2 is calculated using the relation of FIG. 6. In FIG. 6, the relation between the amount of accelerator operation, the vehicle speed, and the deceleration is defined, and the actual deceleration A2 is calculated on the basis of the amount of accelerator operation (amount of pressing the accelerator pedal) detected by the accelerator sensor 41 and the vehicle speed. In this case, the value that is calculated as the actual deceleration A2 increases as the amount of accelerator operation decreases or as the vehicle speed increases.

In subsequent step S24, the threshold value B2 [m/s2] defined as the deceleration of the vehicle in the accelerator-off and clutch-off state (coast deceleration state) is calculated. More specifically, the threshold value B2 is calculated using the correlation data illustrated in FIG. 5. In this case, the clutch-off property XA in FIG. 5 corresponds to the correlation data indicating the correlation between the vehicle deceleration and the vehicle speed in the accelerator-off and clutch-off state. Using the correlation data, the threshold value B2 is calculated on the basis of the current vehicle speed.

In step S25, it is determined whether the actual deceleration A2 is equal to or greater than the threshold value B2. The process advances to step S26 if A2≥B2 is satisfied, and advances to step S27 if A2<B2 is satisfied. In step S26, it is determined to cause the shift to the clutch-off state, that is, cause the shift to the inertia operation state. It is also determined to stop the operation of the engine 11 in response to the shift to the inertia operation state. Alternatively, the engine 11 is put into the idle operation state. In step S27, it is determined to maintain the clutch-on state, that is, maintain the normal operation state.

In such a configuration that the inertia operation is terminated on the condition that the actual deceleration A1 exceeds the threshold value B1 during the inertia operation of the vehicle 10, the vehicle 10 is decelerated by the brake force that depends on the amount of brake operation in the clutch-off state until the deceleration state of the vehicle 10 satisfies "actual deceleration A1≥threshold value B1". After that, once "actual deceleration A1≥threshold value B1" is satisfied, and the clutch is turned on, the vehicle 10 is decelerated by the rotation of the engine output shaft caused by the vehicle shaft side (known as engine braking) as well as by the brake force that depends on the amount of brake operation. In this case, the vehicle 10 is liable to undergo a sudden change in the deceleration at the timing of terminating the inertia operation.

In this regard, in the present embodiment, in a case where the actual deceleration A1 calculated on the basis of the brake operation during the inertia operation is determined to be greater than the threshold value B1, and the inertia operation is terminated, the brake force of the brake device 28 is restricted in the beginning of the termination of the inertia operation. More specifically, in a case where it is determined in step S15 of FIG. 3 that A1≥B1 is satisfied, and the inertia operation is terminated, the engine ECU 31 performs a brake control process illustrated in FIG. 7.

Figure 7:
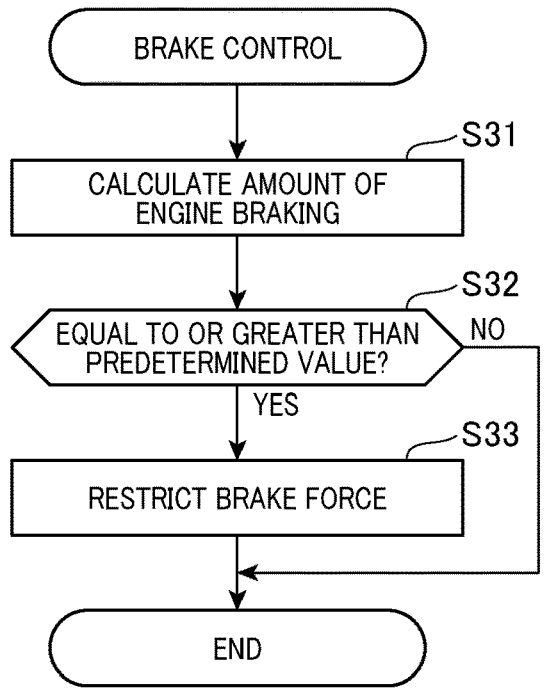
FIG. 7 is a flowchart illustrating a procedure for a brake control process.

In step S31 of FIG. 7, the amount of engine braking that occurs in the vehicle 10 at the time of terminating the inertia operation, that is, at the time of the shift from the clutch-off state to the clutch-on state, is estimated. At this time, the amount of engine braking is estimated on the basis of the drive state of the driven device drivingly coupled to the engine output shaft 12. For example, the amount of engine braking is estimated on the basis of the drive state of the ISG 13 and the accessories 15. Alternatively, the amount of engine braking may be estimated in consideration of the engine rotational speed, the engine water temperature, and the like obtained after the clutch is turned on.

After that, it is determined in step S32 whether the amount of engine braking EB is equal to or greater than a predetermined value. The process advances to step S33 in the case of YES. In step S33, the brake force that is applied by the brake device 28 is restricted. At this time, the brake force corresponding to the amount of engine braking is subtracted from basic brake force calculated on the basis of the amount of brake operation by the driver, whereby command brake force is calculated. Then, the brake force is applied by the brake device 28 on the basis of the command brake force. Note that step S32 can be skipped.

Figure 8:
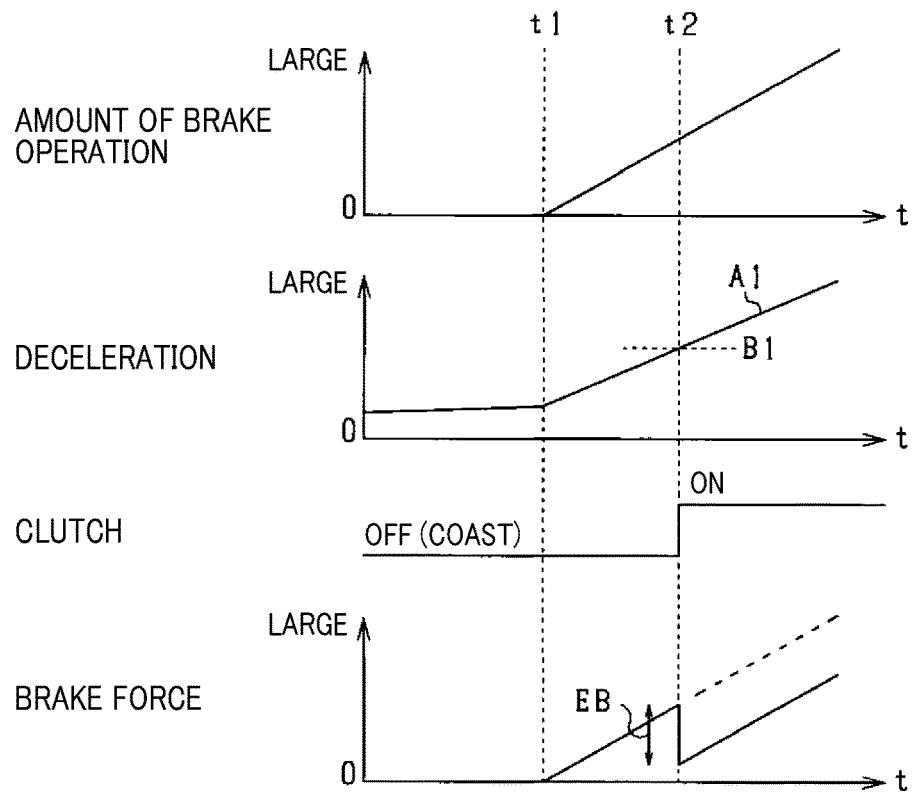
FIG. 8 is a time chart illustrating in detail the brake control for terminating the inertia operation.

FIG. 8 is a time chart illustrating the brake control of FIG. 7 in more detail. In FIG. 8, the driver's brake operation is started at the timing t1 during the inertia operation of the vehicle 10, and the deceleration (negative acceleration) of the vehicle 10 gradually increases as the amount of brake operation (amount of pressing the pedal) increases. Then, at the timing t2 at which the actual deceleration A1 exceeds the threshold value B1, the shift from the clutch-on state to the clutch-off state is performed. Before the timing t2, the vehicle 10 is decelerated by the brake force that depends on the amount of brake operation, whereas the vehicle 10 is decelerated by the engine braking as well as the brake force after the timing t2. At the timing t2, the amount of engine braking EB is calculated, and the brake force of the brake device 28 corresponding to EB is subtracted. After the timing t2, the brake force of the brake device 28 gradually increases.

Figure 9:
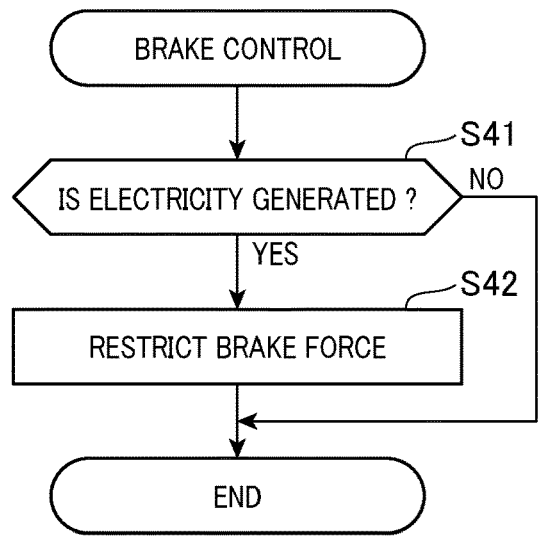
FIG. 9 is a flowchart illustrating a procedure for a brake control process.

Alternatively, a brake control process of FIG. 9 may be performed instead of the process of FIG. 7. In step S41 of FIG. 9, it is determined whether electricity is generated by the ISG 13 immediately after the switch to the clutch-on state. If it is determined to generate electricity, the process advances to step S42, where the brake force that is applied by the brake device 28 is restricted. For example, the brake device 28 is configured not to apply the brake force until a predetermined time elapses after the shift to the clutch-on state. In other words, the brake device 28 is configured to delay starting to apply the brake force.

Figure 10:
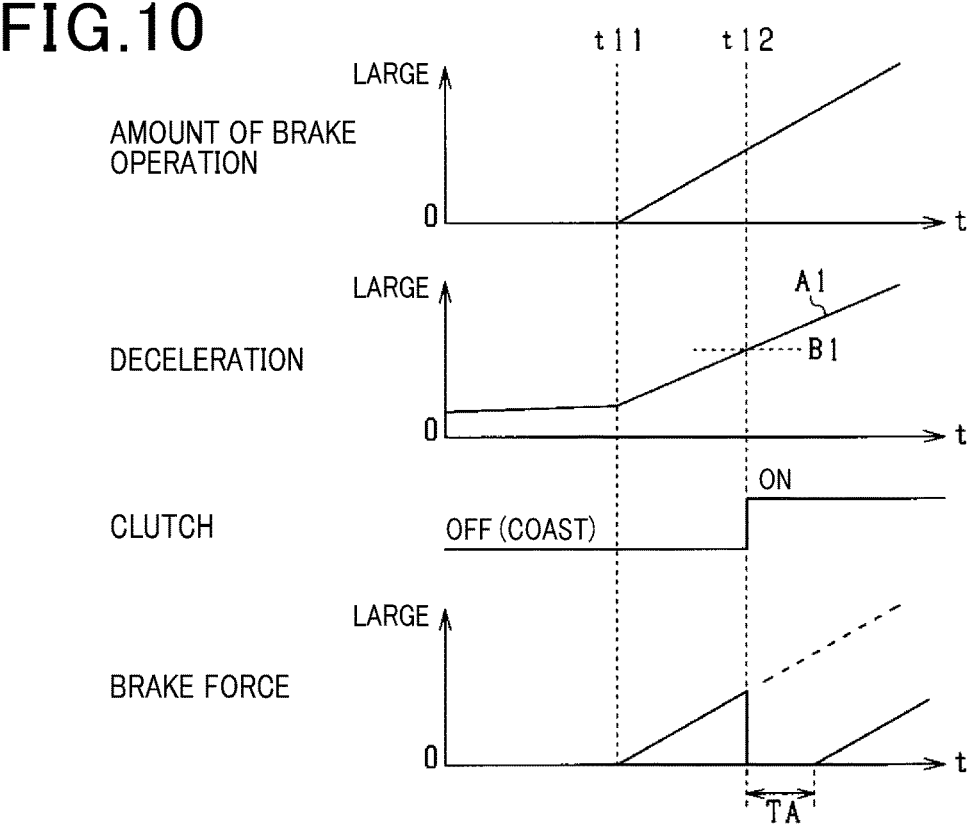
FIG. 10 is a time chart illustrating in detail the brake control for terminating the inertia operation.

FIG. 10 is a time chart illustrating the brake control of FIG. 9 in more detail. In FIG. 10, the driver's brake operation is started at the timing t11 during the inertia operation of the vehicle 10. At the timing t12 at which the actual deceleration A1 exceeds the threshold value B1, the shift from the clutch-off state to the clutch-on state is performed. In a case where electricity is generated by the ISG 13 at the timing t12, the brake device 28 stops applying the brake force during the period TA in the drawing, and starts to apply the brake force after TA elapses.

In a case where the inertia operation is started during the normal operation state, the brake control may be performed. Specifically, in such a configuration that the inertia operation is started on the condition that the actual deceleration A2 exceeds the threshold value B2 during the non-inertia operation of the vehicle 10, the vehicle 10 is decelerated by the rotation of the engine output shaft 12 caused by the vehicle shaft side (what is called engine braking) until the deceleration state of the vehicle 10 satisfies "actual deceleration A2≥threshold value B2". After that, once "actual deceleration A2≥threshold value B2" is satisfied, and the clutch is turned off, the vehicle 10 is decelerated without the brake force corresponding to the engine braking. In this case, the vehicle 10 is liable to undergo a sudden change in the deceleration at the timing of starting the inertia operation.

In this regard, in a case where the actual deceleration A2 is determined to be greater than the threshold value B2 during the non-inertia operation, and the inertia operation is started (in the case of YES in step S25 of FIG. 3), the engine ECU 31 causes the brake device 28 to generate the brake force in the beginning of the start of the inertia operation, regardless of the driver's brake operation. At this time, the engine ECU 31 calculates the amount of engine braking in accordance with the drive state of the driven device such as the ISG 13 and the accessories 15, and adjusts the brake force of the brake device 28 based on the amount of engine braking. Alternatively, the brake force of the brake device 28 can be adjusted on the basis of the vehicle speed in consideration of the fact that the deceleration varies in accordance with the vehicle speed.

Figure 11:
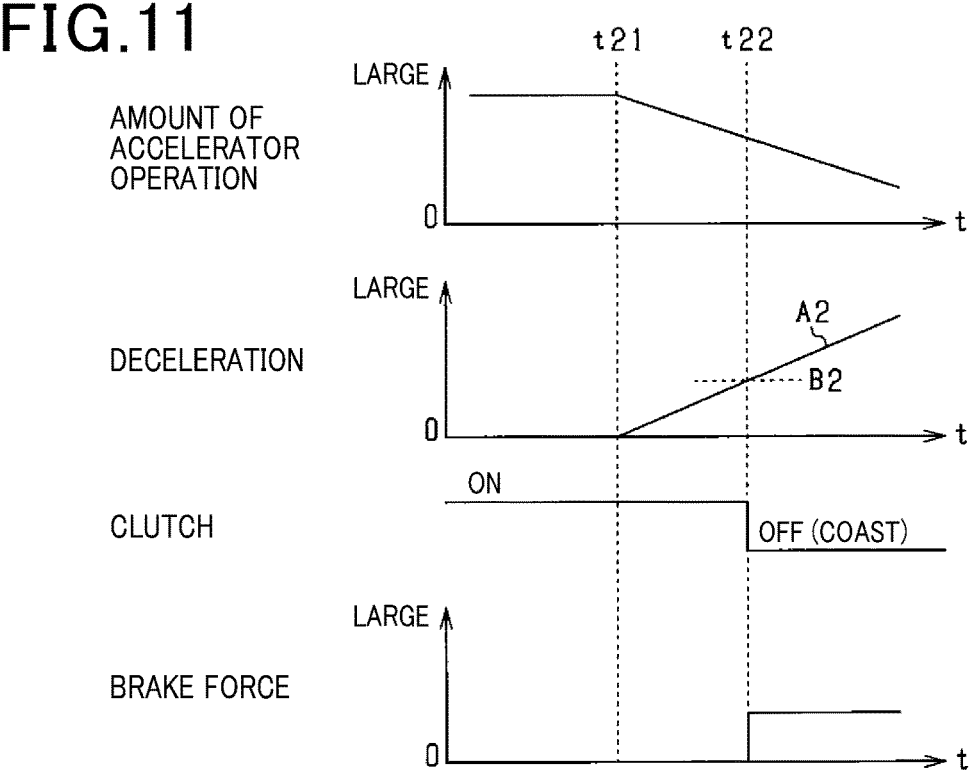
FIG. 11 is a time chart illustrating in detail the brake control for starting the inertia operation.

FIG. 11 is a time chart illustrating in detail the brake control for starting the inertia operation. In FIG. 11, the driver's accelerator operation is moderated at the timing t21 during the non-inertia operation of the vehicle 10, whereby the vehicle 10 is put into the deceleration state, and the deceleration (negative acceleration) of the vehicle 10 gradually increases as the amount of accelerator operation (amount of pressing the pedal) decreases. Then, at the timing t22 at which the actual deceleration A2 exceeds the threshold value B2, the shift from the clutch-on state to the clutch-off state is performed. Before the timing t22, the vehicle 10 is decelerated by the engine braking, whereas the vehicle 10 is decelerated without the engine braking after the timing t22. After the timing t22, the brake force is applied by the brake device 28 in order to compensate for the brake force corresponding to the engine braking. The brake force is preferably applied by the brake device 28 only for a predetermined period of time after the timing t22.

According to the present embodiment described above in detail, the following beneficial effects can be obtained.

In the deceleration state during the inertia operation (clutch-off), the actual deceleration A1 of the vehicle 10 is compared with the threshold value B1 defined as the deceleration of the vehicle 10 in the accelerator-off and clutch-on state, and the inertia operation is terminated if the actual deceleration A1 is greater than the threshold value B1. In this case, the actual deceleration commensurate with the clutch-on state occurs at the time of the shift to the clutch-on state for the termination of the inertia operation, and the deceleration behavior of the vehicle 10 corresponding to a deceleration request from the driver is obtained. If the actual deceleration A1 is less than the threshold value B1, the inertia operation is maintained. In this case, it is possible to prevent the inertia operation from being turned on and off (switched) frequently, and expect an improvement in the fuel efficiency and an improvement in the drivability. As a result, appropriate inertia operation control can be realized.

During the inertia operation, the inertia operation is terminated on the condition that the actual deceleration A1 of the vehicle 10 increases to reach the threshold value B1 on the property XB. Therefore, a desired deceleration is obtained without the need for fuel injection at the time of terminating the inertia operation, and the fuel consumption can be reduced.

The vehicle deceleration degree in the accelerator-off and clutch-on state (non-coast deceleration state) varies in accordance with the vehicle speed. In consideration of this point, the threshold value B1 is calculated on the basis of the vehicle speed, whereby more appropriate inertia operation control can be realized.

In a case where the vehicle 10 is decelerated by the brake operation during the inertia operation, the actual deceleration A1 is calculated on the basis of the amount of brake operation by the driver. Therefore, appropriate inertia operation control can be performed, with a deceleration request from the driver directly reflected.

In a case where the actual deceleration A1 is determined to be greater than the threshold value B1 during the inertia operation, and the inertia operation is terminated, the brake force of the brake device 28 is restricted in the beginning of the termination of the inertia operation. Therefore, a sudden change in the deceleration at the time of terminating the inertia operation is suppressed, and a deterioration in the drivability can be suppressed.

In the beginning period of the termination of the inertia operation, it is adjusted to what extent the brake force of the brake device 28 is restricted on the basis of the electricity generation state of the ISG 13 (drive state of the driven device). In this case, the generation of regenerative electric power is started at the time of terminating the inertia operation in the vehicle deceleration state, and the occurrence of excessive brake force in the vehicle 10 due to the regenerative brake force generated by the regenerative electric power can be suppressed. Consequently, a sudden change in the brake force of the vehicle 10 can be suppressed, and the drivability can be improved.

In the deceleration state during the non-inertia operation (clutch-on), the actual deceleration A2 of the vehicle 10 is compared with the threshold value B2 defined as the deceleration of the vehicle 10 in the accelerator-off and clutch-off state, and the inertia operation is started if the actual deceleration A2 is greater than the threshold value B2. In this case, the actual deceleration commensurate with the clutch-off state occurs at the time of the shift to the clutch-off state for the inertia operation, and the deceleration behavior of the vehicle 10 corresponding to a deceleration request from the driver is obtained. If the actual deceleration A2 is less than the threshold value B2, the non-inertia operation is maintained. In this case, it is possible to prevent the inertia operation from being turned on and off (switched) frequently, and expect an improvement in the fuel efficiency and an improvement in the drivability. As a result, as mentioned previously, appropriate inertia operation control can be realized.

During the non-inertia operation, the inertia operation is started on the condition that the actual deceleration A2 of the vehicle 10 increases to reach the threshold value B2 on the property XA. Therefore, a desired deceleration is obtained without the need for fuel injection at the time of starting the inertia operation, and the fuel consumption can be reduced as mentioned previously.

The vehicle deceleration degree in the accelerator-off and clutch-off state (coast deceleration state) varies in accordance with the vehicle speed. In consideration of this point, the threshold value B2 is calculated on the basis of the vehicle speed, whereby more appropriate inertia operation control can be realized.

In a case where the vehicle 10 is decelerated due to a decrease in the amount of accelerator operation during the non-inertia operation, the actual deceleration A2 is calculated on the basis of the amount of accelerator operation by the driver. Therefore, appropriate inertia operation control can be performed, with a deceleration request from the driver directly reflected.

In a case where the actual deceleration A2 is determined to be greater than the threshold value B2 during the non-inertia operation, and the inertia operation is started, the brake force of the brake device 28 is generated in the beginning of the start of the inertia operation, regardless of the driver's brake operation. Therefore, a sudden change in the deceleration at the time of starting the inertia operation is suppressed, and a deterioration in the drivability can be suppressed.

In the beginning period of the start of the inertia operation, the brake force of the brake device 28 is adjusted on the basis of the drive state of the driven device such as the ISG 13 and the accessories 15. In this case, the brake control can be performed in consideration of the amount of engine braking obtained immediately before the start of the inertia operation although the amount of engine braking changes depending on the drive state of the driven device. Consequently, a sudden change in the deceleration state of the vehicle 10 can be suppressed, and the drivability can be improved.

The properties XA and XB for use in the calculation of the threshold values B1 and B2 are defined in accordance with the gear ratio of the transmission 17. Therefore, desired inertia operation control can be realized in consideration of even the deceleration state that depends on the gear ratio.

In the respective cases where the inertia operation is terminated during the inertia operation (switch from the clutch-off state to the clutch-on state), and where the inertia operation is started during the normal operation (switch from the clutch-on state to the clutch-off state), the termination and start of the inertia operation are appropriately controlled in consideration of the changes in the deceleration degree of the vehicle 10 that occur in accordance with the switch between the on and off states of the clutch device 16. Consequently, it is possible to appropriately control the timings for the termination and start of the inertia operation and how often the inertia operation is performed.

The threshold value B1 of the deceleration for terminating the inertia operation is greater than the threshold value B2 of the deceleration for starting the inertia operation, that is, the threshold value B1 has a larger deceleration degree. Therefore, when the inertia operation is terminated and started, appropriate inertia operation control can be performed, with the clutch-off property XA and the clutch-on property XB of the vehicle 10 reflected.

The following paragraphs propose other embodiments that are different from the above-mentioned first embodiment, and describe in particular the differences from the first embodiment.

Second Embodiment

In the second embodiment, an influence parameter that exerts an influence on the vehicle deceleration in the accelerator-off state is acquired in the vehicle 10, and at least either the actual deceleration or the threshold value during the inertia operation is corrected on the basis of the influence parameter. Similarly, in the vehicle 10, at least either the actual deceleration or the threshold value during the non-inertia operation is corrected on the basis of the influence parameter in the same way.

Figure 12:
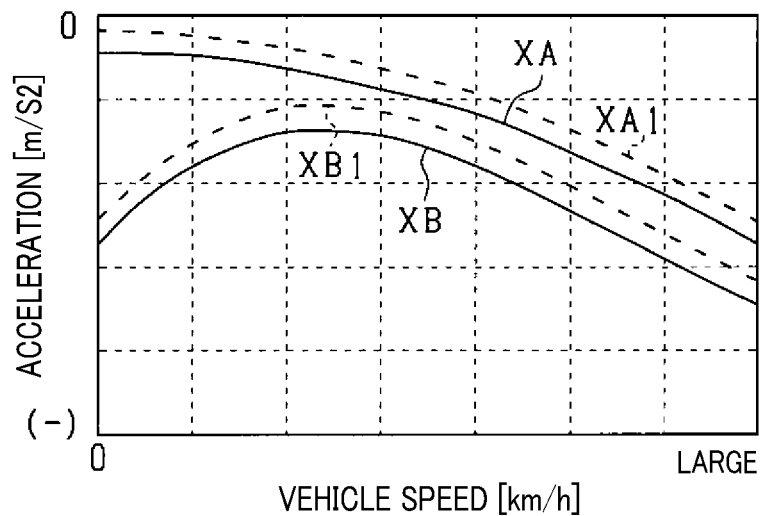
FIG. 12(a) is a diagram illustrating deceleration properties of a vehicle during the downhill operation.
FIG. 12(b) is a diagram illustrating deceleration properties of a vehicle during the uphill operation.
Figure 12:
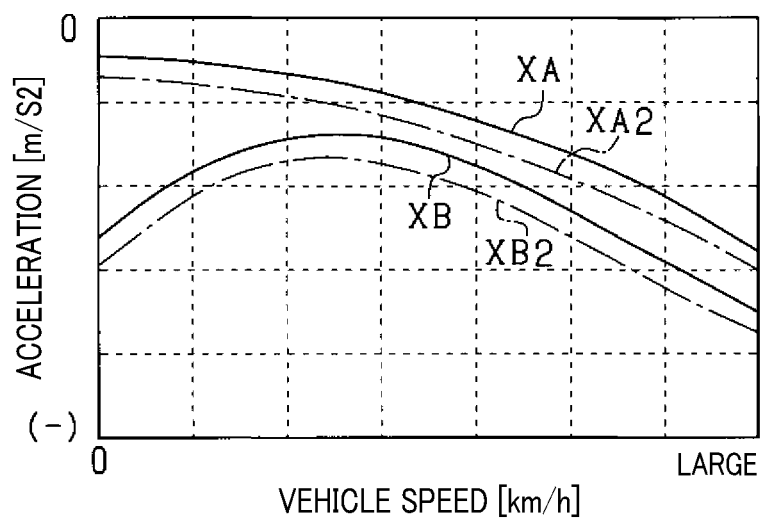

For example, in a case where the vehicle 10 is running on a downhill slope, the vehicle 10 has a small acceleration degree while the accelerator is off. In this case, the deceleration properties of the vehicle 10 are affected, and the deceleration properties change from the basic properties XA and XB represented by the solid lines to properties XA1 and XB1 represented by the broken lines as illustrated in FIG. 12(*a*).

In a case where the vehicle 10 is running on an uphill slope, the vehicle 10 has a large deceleration degree while the accelerator is off. In this case, similarly, the deceleration properties of the vehicle 10 are affected, and the deceleration properties change from the basic properties XA and XB represented by the solid lines to properties XA2 and XB2 represented by the chain lines as illustrated in FIG. 12(*b*).

The downhill corresponds to a factor causing a decrease in the deceleration of the vehicle 10, and the uphill corresponds to a factor causing an increase in the deceleration of the vehicle 10.

In this regard, the actual decelerations A1 and A2 and the threshold values B1 and B2 are corrected in consideration of the changes in the deceleration properties, and the corrected actual decelerations A1 and A2 are compared with the corrected threshold values B1 and B2, respectively.

The influence parameter corresponds to at least either the state of the vehicle or the running environment. More specifically, parameters such as (1) the inclination of a road, (2) the state of a road surface, (3) running resistance, (4) the number of occupants and loaded weight, and (5) temporal change can be used. Among them, (1) the inclination of a road can be detected by the inclination angle sensor 44, and some of (2) to (5) can be directly detected by sensors or the like. However, information can be acquired in a predetermined stable operation state, instead of being acquired using the sensors for detection. For example, information is acquired by comparison with a reference value while the vehicle is running on a flat road with no inclination in the accelerator-off and brake-off state.

Each of the above parameters exerts an influence on the vehicle deceleration (i.e., increase/decrease in the vehicle deceleration). If the value of each parameter corresponds to a value causing a decrease in the deceleration as in the case of the downhill operation, the actual decelerations A1 and A2 and the threshold values B1 and B2 are calculated using the properties XA1 and XB1 (properties having smaller decelerations than the basic properties XA and XB) illustrated in FIG. 12(*a*). If the value of each parameter corresponds to a value causing an increase in the deceleration as in the case of the uphill operation, the actual decelerations A1 and A2 and the threshold values B1 and B2 are calculated using the properties XA2 and XB2 (properties having larger decelerations than the basic properties XA and XB) illustrated in FIG. 12(*b*). Using such a computation process, the actual decelerations and the threshold values are corrected.

Figure 13:
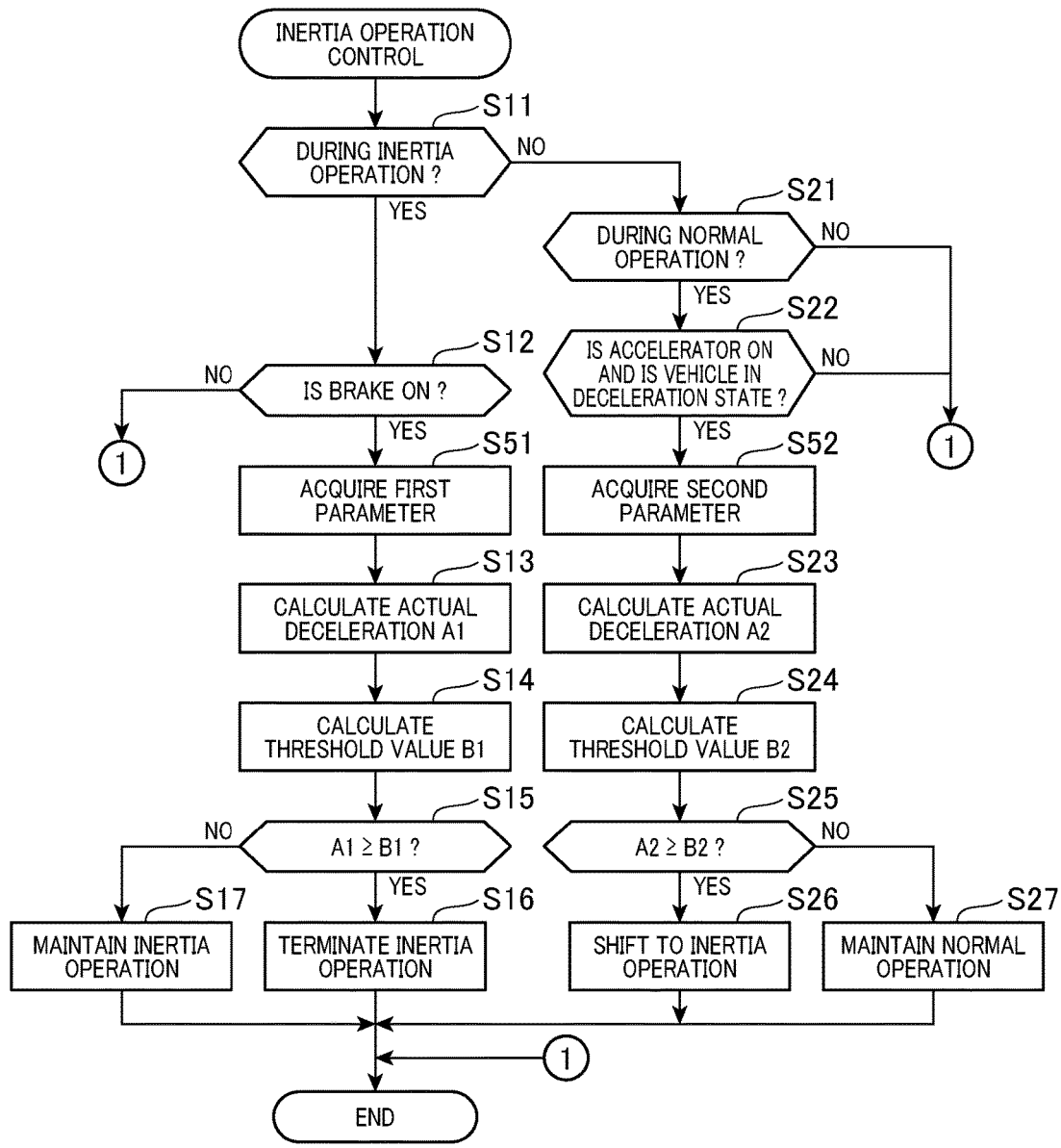
FIG. 13 is a flowchart illustrating a procedure for an inertia operation control process according to a second embodiment.

FIG. 13 is a flowchart illustrating a procedure for the inertia operation control process. This process is a substitute for the above-mentioned process of FIG. 3, and repeatedly performed by the engine ECU 31 at predetermined intervals. In FIG. 13, steps similar to those of FIG. 3 are denoted by the same step numbers for ease of explanation. Differences from the process of FIG. 3 are the addition of steps S51 and S52 and changes in the processing details of steps S13, S14, S23, and S24.

In FIG. 13, in a case where the vehicle 10 is in the inertia operation state and in the brake-on state (in the case of YES in steps S11 and S12), the process advances to step S51. In step S51, a first parameter is acquired as the influence parameter. The first parameter is at least any of (1) to (5) mentioned above. After that, in step S13, the actual deceleration A1 [m/s2] of the vehicle that occurs in conjunction with the driver's brake operation is calculated, and the threshold value B1 [m/s2] is calculated in subsequent step S14. At this time, the actual deceleration A1 and the threshold value B1 are calculated in consideration of the fact that the deceleration properties change due to the first parameter as illustrated in FIGS. 12(*a*) and 12(*b*). The first parameter can also be applied to (correction can be performed on) either the actual deceleration A1 or the threshold value B1. Subsequently, it is determined to terminate or maintain the inertia operation on the basis of the actual deceleration A1 and the threshold value B1 (steps S15 to S17).

In a case where the vehicle 10 is in the normal operation state and in the accelerator-on deceleration state (in the case of YES in steps S21 and S22), the process advances to step S52. In step S52, a second parameter is acquired as the influence parameter. The second parameter is at least any of (1) to (5) mentioned above. Alternatively, the first and second parameters may be integrated as a common parameter. After that, in step S23, the actual deceleration A2 [m/s2] of the vehicle that occurs in conjunction with a decrease in the amount of accelerator operation by the driver is calculated, and the threshold value B2 [m/s2] is calculated in subsequent step S24. At this time, the actual deceleration A2 and the threshold value B2 are calculated in consideration of the fact that the deceleration properties change due to the second parameter as illustrated in FIGS. 12(*a*) and 12(*b*). The second parameter can also be applied to (correction can be performed on) either the actual deceleration A2 or the threshold value B2. Subsequently, it is determined to cause the shift to the inertia operation or maintain the normal operation on the basis of the actual deceleration A2 and the threshold value B2 (steps S25 to S27).

According to the above configuration, it is possible to suitably deal with the case where the vehicle deceleration degree varies due to changes in the state of the vehicle 10 or the running environment. Consequently, appropriate inertia operation control can be performed in consideration of the actual usage conditions of the vehicle.

Alternatively, the deceleration deviation from the basic property XA or XB may be calculated on the basis of the influence parameter, and the actual deceleration A1 or A2 and the threshold value B1 or B2 may be corrected on the basis of the deviation.

Third Embodiment

Figure 14:
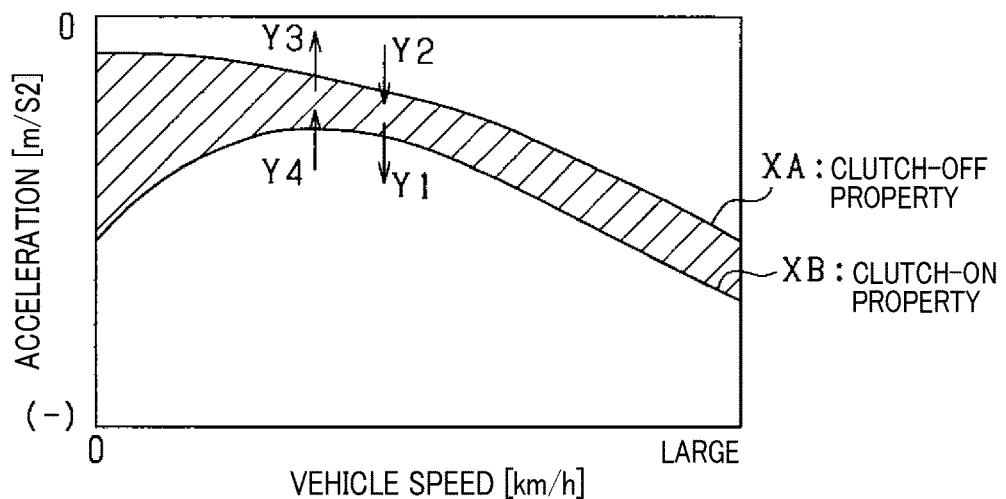
FIG. 14 is a diagram illustrating deceleration properties that depend on the vehicle speed.

During the vehicle operation, the switch from the inertia operation to the non-inertia operation and the switch from the non-inertia operation to the inertia operation are performed as necessary. In this case, in FIG. 14 illustrating deceleration properties that depend on the vehicle speed, the inertia operation is started in accordance with the change Y2, and the inertia operation is terminated in accordance with the change Y1. Similarly, the inertia operation is started in accordance with the change Y4, and the inertia operation is terminated in accordance with the change Y3. Specifically, the region between the clutch-off property XA for the inertia operation of the vehicle 10 in the accelerator-off and clutch-off state and the clutch-on property XB for the normal operation of the vehicle 10 in the accelerator-off and clutch-on state is defined as an inertia operation region for performing the inertia operation of the vehicle 10. The inertia operation is started when the deceleration degree of the vehicle 10 changes from the outside to the inside of the inertia operation region (Y2 and Y4), and the inertia operation is terminated when the deceleration degree of the vehicle 10 changes from the inside to the outside of the inertia operation region (Y1 and Y3). Note that "Y1 and Y2" correspond to the state shifts described in the first embodiment.

Figure 15:
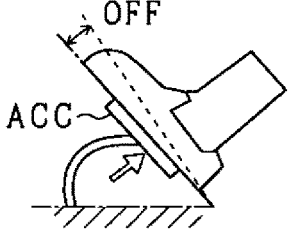
FIG. 15 is a diagram illustrating the relation between the start and termination of the inertia operation and a driver's accelerator operation and brake operation.

The relation between the start and termination of the inertia operation and the driver's accelerator operation and brake operation will be described in detail using FIG. 15. In FIG. 15, the reference sign ACC represents the accelerator pedal, and the reference sign BR represents the brake pedal.

Y1 indicates that the amount of brake operation increases in the vehicle deceleration state during the inertia operation. In such a case, the inertia operation is terminated in accordance with the state shift from a region having a smaller deceleration than the clutch-on property XB to a region having a larger deceleration than the clutch-on property XB.

Y2 indicates that the amount of accelerator operation decreases in the vehicle deceleration state during the non-inertia operation. In such a case, the inertia operation is started in accordance with the state shift from a region having a smaller deceleration than the clutch-off property XA to a region having a larger deceleration than the clutch-off property XA.

Y3 indicates that the amount of accelerator operation increases in the vehicle deceleration state during the inertia operation. In such a case, the inertia operation is terminated in accordance with the state shift from a region having a larger deceleration than the clutch-off property XA to a region having a smaller deceleration than the clutch-off property XA.

Y4 indicates that the amount of brake operation decreases in the vehicle deceleration state during the non-inertia operation. In such a case, the inertia operation is started in accordance with the state shift from a region having a larger deceleration than the clutch-on property XB to a region having a smaller deceleration than the clutch-on property XB.

Figure 16:
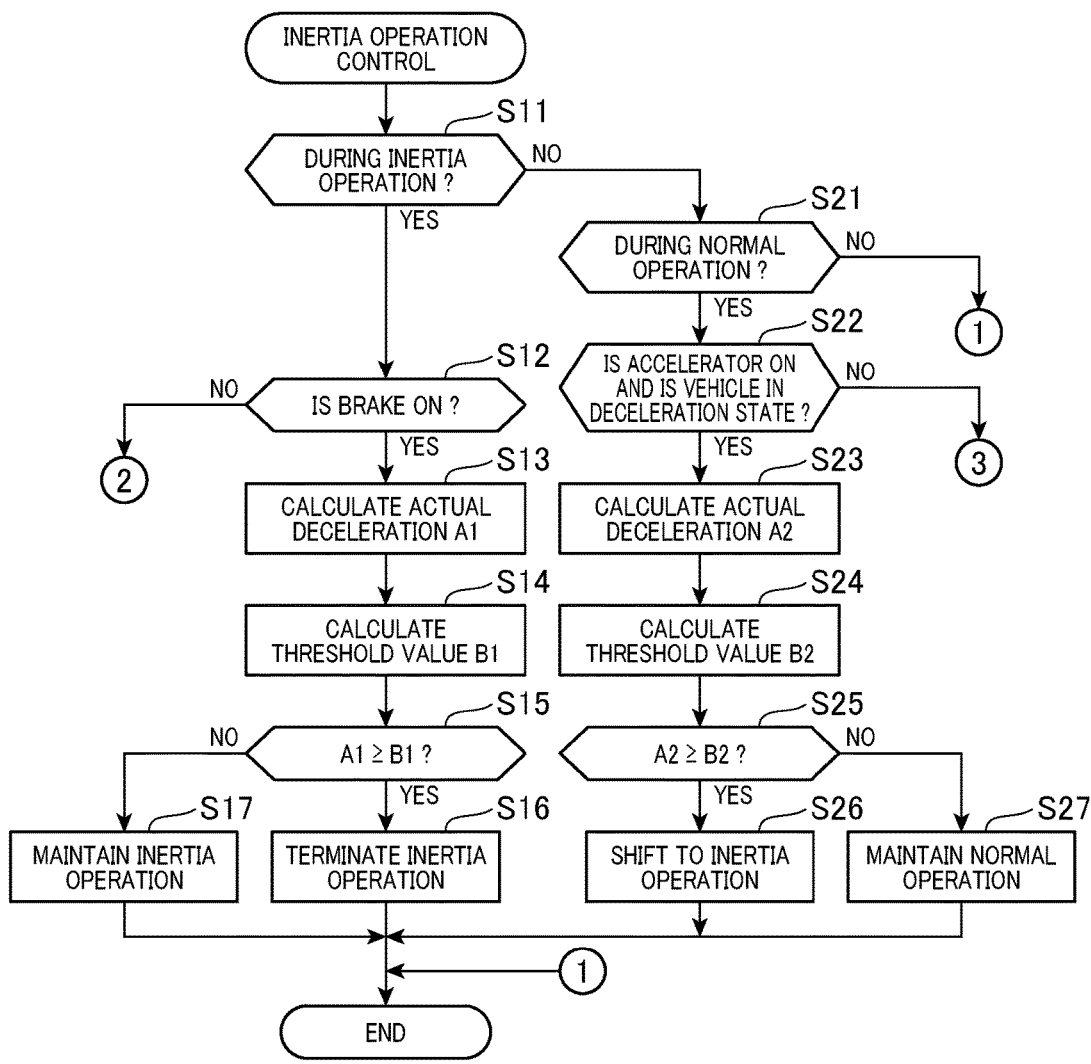
FIG. 16 is a flowchart illustrating a procedure for an inertia operation control process according to a third embodiment.
Figure 17:
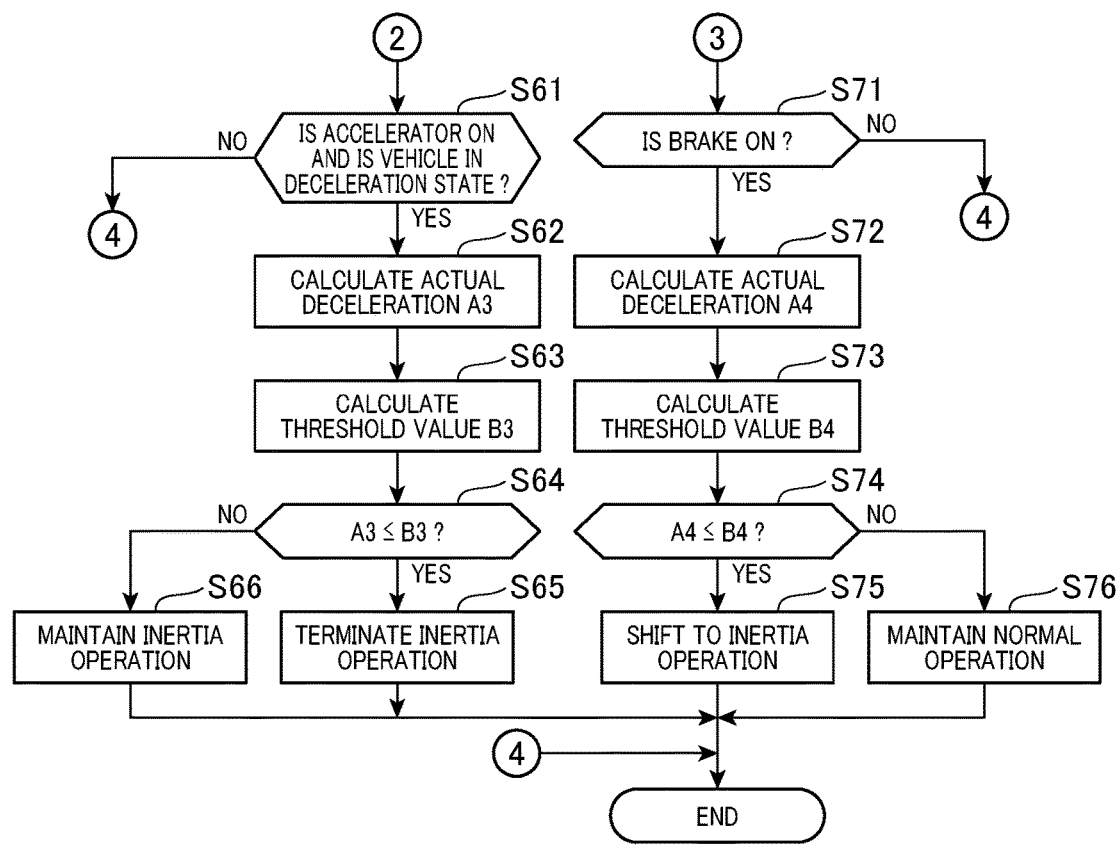
FIG. 17 is a continuation of FIG. 16 illustrating a flowchart of the procedure for the inertia operation control process according to the third embodiment.

In the third embodiment, the inertia operation control is performed assuming that all the above cases Y1 to Y4 are possible. FIGS. 16 and 17 are flowcharts illustrating a procedure for the inertia operation control process. This process is repeatedly performed by the engine ECU 31 at predetermined intervals. In FIG. 16, steps S11 to S17 and steps S21 to S27 are similar to those of FIG. 3 mentioned above, and the detailed descriptions thereof are omitted. FIG. 16 is different from FIG. 3 in that the flow moves on to another process if the vehicle performs the inertia operation and the brake is not on (in the case of YES in S11 and NO in S12) and that the flow moves on to another process if the vehicle performs the normal operation and is in the deceleration state other than the accelerator-on state (in the case of YES in S21 and NO in S22).

In FIG. 16, the process including steps S11, S12, S13, S14, S15, and S16 in this order corresponds to "Y1" mentioned above. The process including steps S11, S21, S22, S23, S24, S25, and S26 in this order corresponds to "Y2" mentioned above.

In FIG. 16, if the vehicle performs the inertia operation and the brake is not on (in the case of YES in S11 and NO in S12), the process advances to step S61 of FIG. 17. In step S61, it is determined whether the accelerator is on and the vehicle is in the deceleration state. The determination is performed on the basis of the detection result of the accelerator sensor 41 and the detection result of the vehicle speed sensor 43 in the same way as in step S22. The process advances to step S62 in the case of YES in step S61.

Figure 18:
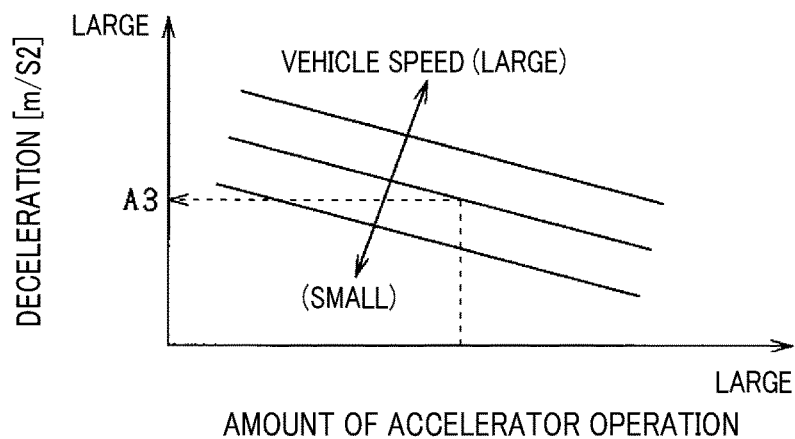
FIG. 18 is a diagram illustrating the relation between the amount of accelerator operation, the vehicle speed, and the deceleration.

In step S62, an actual deceleration A3 [m/s2] of the vehicle that occurs when the amount of accelerator operation by the driver increases is calculated. More specifically, the actual deceleration A3 is calculated using the relation illustrated in FIG. 18. In FIG. 18, the relation between the amount of accelerator operation, the vehicle speed, and the deceleration is defined, and the actual deceleration A3 is calculated on the basis of the amount of accelerator operation (amount of pressing the accelerator pedal) detected by the accelerator sensor 41 and the vehicle speed. In this case, the value that is calculated as the actual deceleration A3 decreases as the amount of accelerator operation increases or as the vehicle speed decreases.

The relation of FIG. 18 is the same as the relation for obtaining the actual deceleration A2 illustrated in FIG. 6. However, the relation of FIG. 18 may be different from the relation of FIG. 6. For example, the actual deceleration A3 can be greater or less than the actual deceleration A2 when they are compared at the same amount of accelerator operation and the same vehicle speed.

Figure 19:
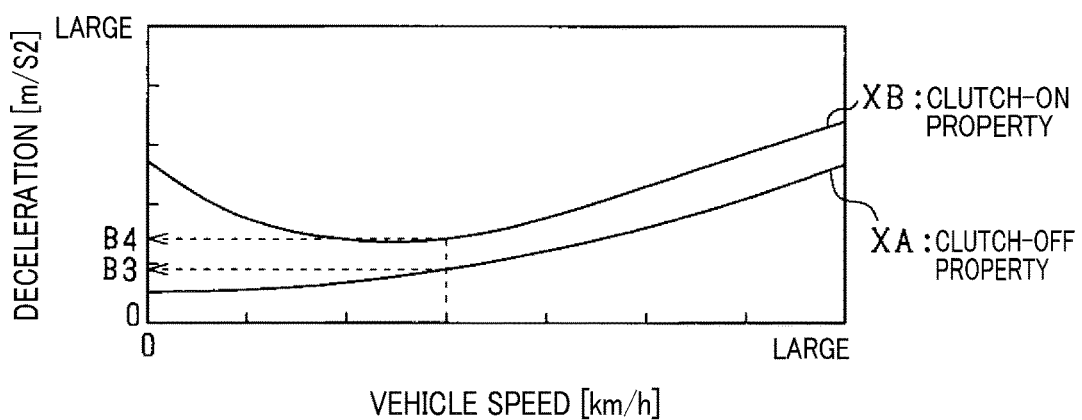
FIG. 19 is a diagram illustrating deceleration properties that depend on the vehicle speed.

In subsequent step S63, a threshold value B3 [m/s2] defined as the deceleration of the vehicle in the accelerator-off and clutch-off state (coasting deceleration state) is calculated. More specifically, the threshold value B3 is calculated using correlation data illustrated in FIG. 19 on the basis of the vehicle speed.

In step S64, it is determined whether the actual deceleration A3 is equal to or less than the threshold value B3. The process advances to step S65 if A3≤B3 is satisfied, and advances to step S66 if A3>B3 is satisfied. In step S65, it is determined to cause the shift to the clutch-on state, that is, terminate the inertia operation state. At this time, the operation (fuel injection) of the engine 11 is started, whereby the deceleration degree in a deceleration range that is more moderate than the clutch-off property XA, that is, the deceleration degree in a deceleration range that cannot be achieved in the inertia operation state, can be realized. The process of step S65 corresponds to "Y3" mentioned above. In step S66, it is determined to maintain the clutch-off state, that is, maintain the inertia operation state.

In FIG. 16, if the vehicle performs the normal operation and is in the deceleration state other than the accelerator-on state (in the case of YES in S21 and NO in S22), the process advances to step S71 of FIG. 17. In step S71, it is determined whether the brake is on. The determination is performed on the basis of the detection result of the brake sensor 42 in the same way as in step S12. The process advances to step S72 in the case of YES in step S71.

Figure 20:
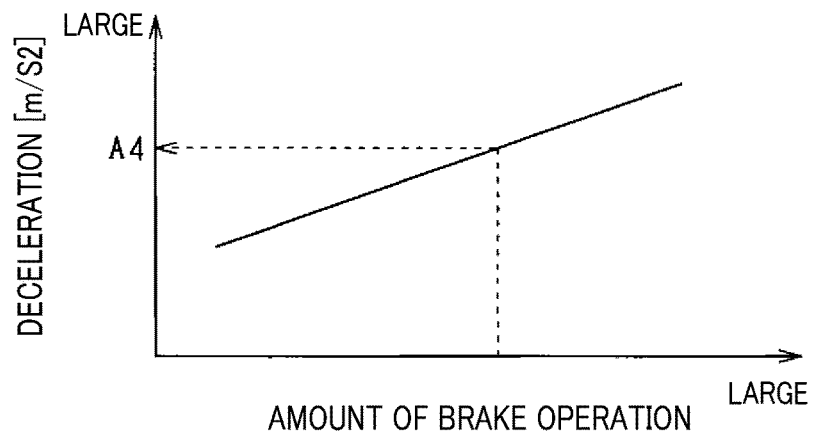
FIG. 20 is a diagram illustrating the relation between the amount of brake operation and the deceleration.

In step S72, an actual deceleration A4 [m/s2] of the vehicle that occurs in conjunction with the driver's brake operation is calculated. More specifically, the actual deceleration A4 is calculated using the relation of FIG. 20. In FIG. 20, the relation between the amount of brake operation and the deceleration is defined, and the actual deceleration A4 is calculated on the basis of the amount of brake operation (amount of pressing the brake pedal) detected by the brake sensor 42. In this case, the value that is calculated as the actual deceleration A4 decreases as the amount of brake operation decreases.

The relation of FIG. 20 is the same as the relation for obtaining the actual deceleration A1 illustrated in FIG. 4. However, the relation of FIG. 20 may be different from the relation of FIG. 4. For example, the actual deceleration A4 can be greater or less than the actual deceleration A1 when they are compared at the same amount of brake operation.

In subsequent step S73, a threshold value B4 [m/s2] defined as the deceleration of the vehicle in the accelerator-off and clutch-on state (non-coast deceleration state) is calculated. More specifically, the threshold value B4 is calculated using the correlation data illustrated in FIG. 19 on the basis of the vehicle speed.

In step S74, it is determined whether the actual deceleration A4 is equal to or less than the threshold value B4. The process advances to step S75 if A4≤B4 is satisfied, and advances to step S76 if A4>B4 is satisfied. In step S75, it is determined to cause the shift to the clutch-off state, that is, cause the shift to the inertia operation state. It is also determined to stop the operation of the engine 11 in response to the shift to the inertia operation state. Alternatively, the engine 11 is put into the idle operation state. The process of step S75 corresponds to "Y4" mentioned above. In step S76, it is determined to maintain the clutch-on state, that is, maintain the normal operation state.

Next, the brake control of the brake device 28 and the torque assist control of the ISG 13 for the case of the state shift between the inertia operation and the non-inertia operation will be described.

When the amount of brake operation is increased during the inertia operation, and the actual deceleration increases, the inertia operation is terminated, and the engine braking occurs in response to the termination of the inertia operation, whereby the deceleration degree of the vehicle is affected through the termination of the inertia operation (in the case of "Y1"). In the present embodiment, therefore, the brake force is restricted in consideration of the occurrence of the engine braking. This point has already been described in the first embodiment (refer to FIGS. 7 to 10).

In contrast, when the amount of brake operation is reduced during the normal operation (non-inertia operation), and the actual deceleration decreases, the inertia operation is started, and the braking force corresponding to the engine braking is lost due to the start of the inertia operation, whereby the deceleration degree of the vehicle is liable to be affected through the termination of the inertia operation (in the case of "Y4"). In the present embodiment, therefore, the brake assist (application of brake force) is performed by the brake device 28 in consideration of the suspension of the engine braking. Specifically, in a case where the actual deceleration A4 calculated on the basis of the brake operation during the normal operation (non-inertia operation) is determined to be less than the threshold value B4, and the inertia operation is started, the brake assist is performed by the brake device 28 in the beginning of the start of the inertia operation. More specifically, in a case where it is determined in step S74 of FIG. 17 that A4≤B4 is satisfied, and the inertia operation is started, the engine ECU 31 performs a brake control process illustrated in FIG. 21.

Figure 21:
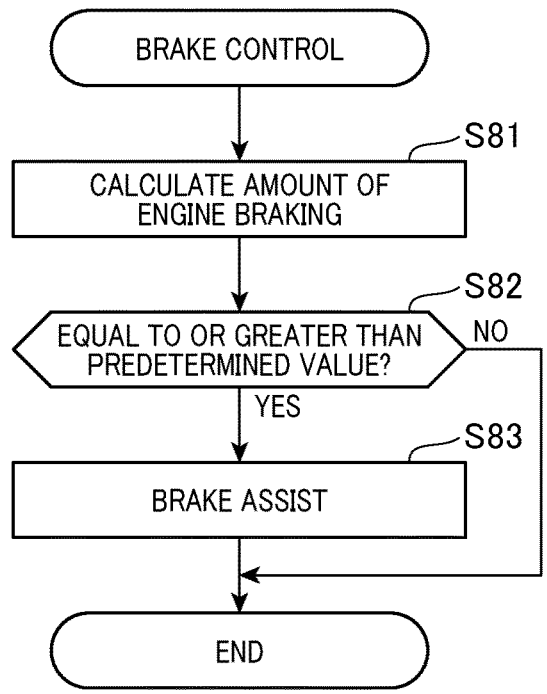
FIG. 21 is a flowchart illustrating a procedure for a brake control process.

In step S81 of FIG. 21, the amount of engine braking of the vehicle 10 that is lost in response to the start of the inertia operation is estimated. At this time, the amount of engine braking is estimated on the basis of the drive state of the driven device drivingly coupled to the engine output shaft 12. For example, the amount of engine braking is estimated on the basis of the drive state of the ISG 13 and the accessories 15. Alternatively, the amount of engine braking may be estimated in consideration of the engine rotational speed, the engine water temperature, and the like obtained before the clutch is turned off.

After that, it is determined in step S82 whether the amount of engine braking EB is equal to or greater than a predetermined value. The process advances to step S83 in the case of YES. In step S83, the brake force is additionally applied by the brake device 28, and the brake assist is performed. At this time, the brake force corresponding to the amount of engine braking is added to the basic brake force calculated on the basis of the amount of brake operation by the driver, whereby command brake force is calculated. Then, the brake force is applied by the brake device 28 on the basis of the command brake force. Note that step S82 can be skipped.

Figure 22:
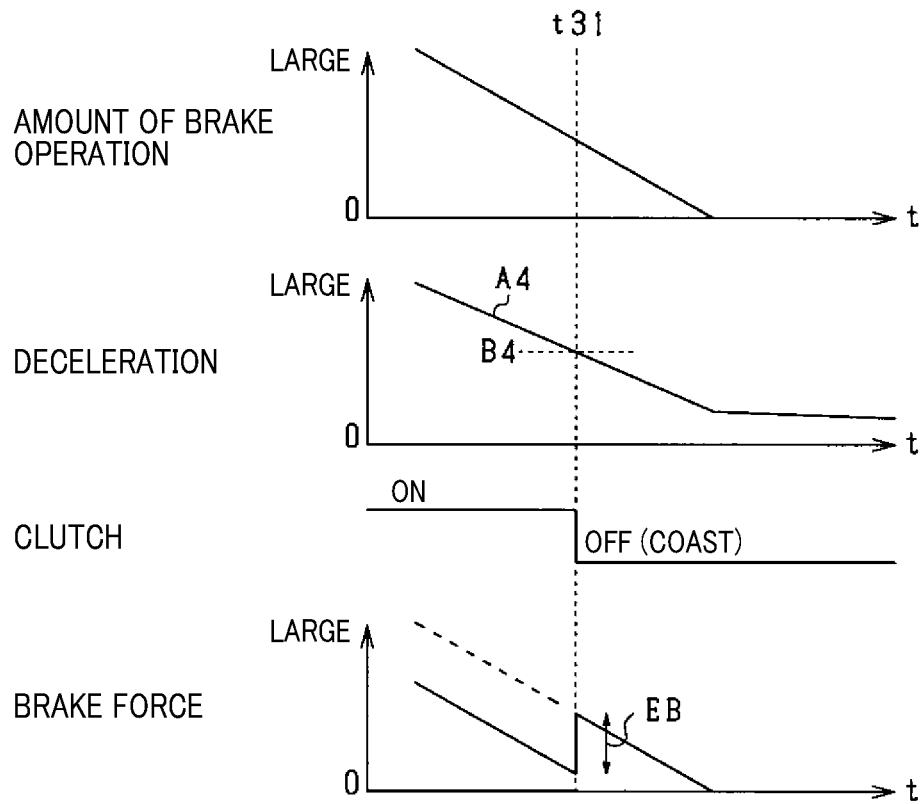
FIG. 22 is a time chart illustrating in detail the brake control for starting the inertia operation.

FIG. 22 is a time chart illustrating the brake control of FIG. 21 in more detail. In FIG. 22, the driver's brake operation is performed before the timing t31 during the normal operation of the vehicle 10 in the clutch-on state, and the deceleration occurs in the vehicle 10 in accordance with the basic brake force corresponding to the amount of brake operation (amount of pressing the pedal) and the engine brake force. The amount of brake operation by the driver is reduced as time elapses, and the deceleration (negative acceleration) of the vehicle 10 gradually decreases accordingly.

Then, at the timing t31 at which the actual deceleration A4 falls below the threshold value B4, the shift from the clutch-on state to the clutch-off state is performed. At this time, the engine braking is stopped in response to the shift to the clutch-off state. However, since the brake force corresponding to the engine braking is additionally applied by the brake device 28, a change (sudden change) in the deceleration degree of the vehicle 10 is suppressed at the timing t31. Alternatively, the brake force corresponding to the engine braking may be applied at the time of starting the inertia operation, and the application of the brake force may be gradually reduced as time elapses.

Figure 23:
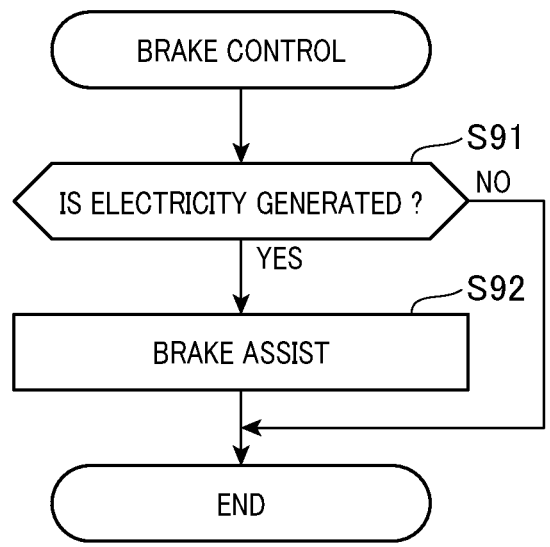
FIG. 23 is a flowchart illustrating a procedure for a brake control process.

Alternatively, a brake control process of FIG. 23 may be performed instead of the process of FIG. 21. In step S91 of FIG. 23, it is determined whether electricity is generated by the ISG 13 before the inertia operation is started. If it is determined that electricity is generated, the process advances to step S92, where the brake force is additionally applied by the brake device 28, and the brake assist is performed. At this time, the brake assist is preferably performed so as to compensate for the sum of the engine braking and dynamic braking (electricity generation load).

Figure 24:
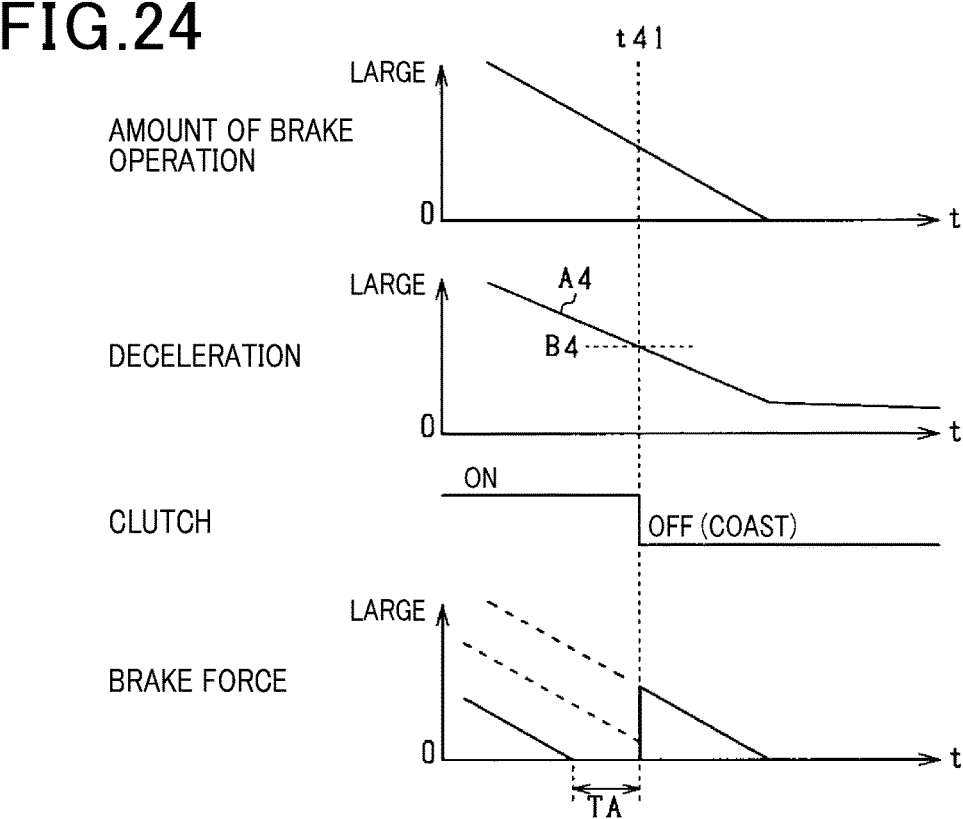
FIG. 24 is a time chart illustrating in detail the brake control for starting the inertia operation.

FIG. 24 is a time chart illustrating the brake control of FIG. 23 in more detail. In FIG. 24, the driver's brake operation is performed before the timing t41 during the normal operation of the vehicle 10 in the clutch-on state, and the basic brake force corresponding to the amount of brake operation (amount of pressing the pedal), the engine brake force, and the brake force corresponding to the electricity generation load of the ISG 13 occur in the vehicle 10. The amount of brake operation by the driver is reduced as time elapses, and the deceleration (negative acceleration) of the vehicle 10 gradually decreases accordingly.

Then, at the timing t41 at which the actual deceleration A4 falls below the threshold value B4, the shift from the clutch-on state to the clutch-off state is performed. At this time, the brake force corresponding to the engine braking and the electricity generation load is lost in response to the shift to the clutch-off state. However, since the brake force corresponding to the lost brake force is additionally applied by the brake device 28, a change (sudden change) in the deceleration degree of the vehicle 10 is suppressed at the timing t41.

The brake control or torque assist control may be performed not only when the inertia operation is started or terminated in response to a decrease or increase in the amount of brake operation (in the case of "Y1 and Y4") but also when the inertia operation is started or terminated in response to a decrease or increase in the amount of accelerator operation (in the case of "Y2 and Y3").

Specifically, in a case where the inertia operation is started in response to a decrease in the amount of accelerator operation (in the case of "Y2"), the vehicle 10 is decelerated by the engine braking before the inertia operation is started, and the brake force corresponding to the engine braking is lost in response to the start of the inertia operation. In this regard, in a case where the actual deceleration increases due to the decrease in the amount of accelerator operation (A2≥B2 is satisfied in S25 of FIG. 16), and the inertia operation is started, the engine ECU 31 causes the brake device 28 to generate the brake force in the beginning of the start of the inertia operation, regardless of the driver's brake operation. The brake control for the case of Y2 has already been described in the first embodiment using FIG. 11.

In a case where the inertia operation is terminated in response to an increase in the amount of accelerator operation (in the case of "Y3"), the engine braking does not occur before the end of the inertia operation, and the vehicle 10 is decelerated by the engine braking in response to the end of the inertia operation. In this regard, in a case where the actual deceleration decreases due to the increase in the amount of accelerator operation (A3≤B3 is satisfied in S64 of FIG. 17), and the inertia operation is terminated, the engine ECU 31 causes the ISG 13 to perform the torque assist immediately after the inertia operation is ended. In this case, the engine ECU 31 estimates the amount of engine braking in accordance with the vehicle speed, the gear ratio of the transmission 17, the engine rotational speed, and the like obtained at the time of terminating the inertia operation, and adjusts the amount of torque assist by the ISG 13 based on the amount of engine braking.

Figure 25:
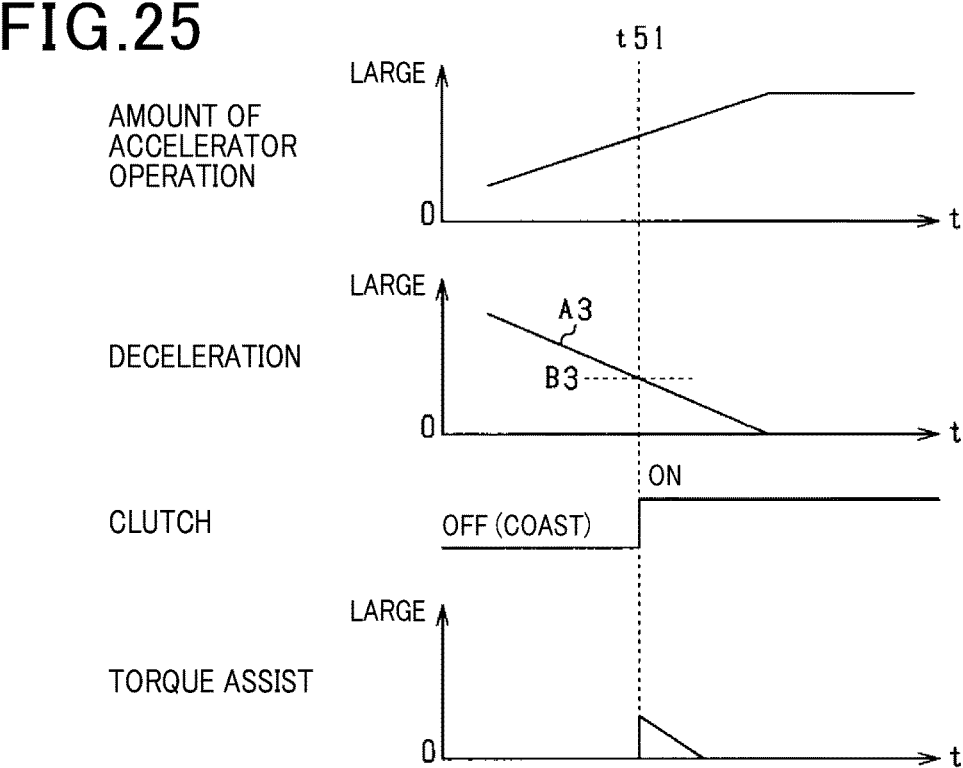
FIG. 25 is a time chart illustrating in detail torque control for terminating the inertia operation.

FIG. 25 is a time chart illustrating in detail the torque control for terminating the inertia operation. In FIG. 25, the deceleration (negative acceleration) of the vehicle 10 gradually decreases as the amount of accelerator operation (amount of pressing the pedal) by the driver increases in the vehicle deceleration state during the inertia operation. Then, at the timing t51 at which the actual deceleration A3 falls below the threshold value B3, the shift from the clutch-off state to the clutch-on state is performed. At this time, the engine braking does not occur before the timing t51, whereas the engine braking occurs at the timing t51. In the beginning of the termination of the inertia operation at the timing t51, the torque assist is performed by the ISG 13 in order to compensate for the deceleration caused by the engine braking. The torque assist is preferably performed by the ISG 13 only for a predetermined period of time after the timing t51. Preferably, the amount of torque assist is gradually reduced as time elapses.

According to the above-mentioned third embodiment, the following beneficial effects can be obtained. Note that the following effects are additionally obtained along with the effects of the first embodiment.

In the deceleration state during the inertia operation (clutch-off), the actual deceleration A3 of the vehicle 10 is compared with the threshold value B3 defined as the deceleration of the vehicle 10 in the accelerator-off and clutch-off state, and the inertia operation is terminated if the actual deceleration A3 is less than the threshold value B3 (corresponding to Y3 of FIG. 14). In this case, the actual deceleration commensurate with the clutch-on state occurs at the time of the shift to the clutch-on state for the termination of the inertia operation, and the deceleration behavior of the vehicle 10 corresponding to a deceleration request from the driver is obtained. If the actual deceleration A3 is less than the threshold value B3, the inertia operation is maintained. In this case, it is possible to prevent the inertia operation from being turned on and off (switched) frequently, and expect an improvement in the fuel efficiency and an improvement in the drivability. As a result, appropriate inertia operation control can be realized.

During the inertia operation, the inertia operation is terminated on the condition that the actual deceleration A3 of the vehicle 10 decreases to reach the threshold value B3 on the property XA. Therefore, the deceleration degree in a deceleration range that cannot be achieved in the inertia operation state can be realized at the time of terminating the inertia operation. Consequently, a desired deceleration degree can be realized.

The vehicle deceleration degree in the accelerator-off and clutch-off state (coast deceleration state) varies in accordance with the vehicle speed. In consideration of this point, the threshold value B3 is calculated on the basis of the vehicle speed, whereby more appropriate inertia operation control can be realized.

In a case where the vehicle 10 is decelerated by the accelerator operation during the inertia operation, the actual deceleration A3 is calculated on the basis of the amount of accelerator operation by the driver. Therefore, appropriate inertia operation control can be performed, with a deceleration request from the driver directly reflected.

In a case where the actual deceleration A3 is determined to be less than the threshold value B3, and the inertia operation is terminated, the torque assist is performed by the ISG 13 in the beginning of the termination of the inertia operation. Therefore, a sudden change in the deceleration at the time of terminating the inertia operation is suppressed, and a deterioration in the drivability can be suppressed.

In the deceleration state during the non-inertia operation (clutch-on), the actual deceleration A4 of the vehicle 10 is compared with the threshold value B4 defined as the deceleration of the vehicle 10 in the accelerator-off and clutch-on state, and the inertia operation is started if the actual deceleration A4 is less than the threshold value B4 (corresponding to Y4 of FIG. 14). In this case, the actual deceleration commensurate with the clutch-off state occurs at the time of the shift to the clutch-off state for the inertia operation, and the deceleration behavior of the vehicle 10 corresponding to a deceleration request from the driver is obtained. If the actual deceleration A4 is greater than the threshold value B4, the non-inertia operation is maintained. In this case, it is possible to prevent the inertia operation from being turned on and off (switched) frequently, and expect an improvement in the fuel efficiency and an improvement in the drivability. As a result, as mentioned previously, appropriate inertia operation control can be realized.

During the non-inertia operation, the inertia operation is started on the condition that the actual deceleration A4 of the vehicle 10 decreases to reach the threshold value B4 on the property XB. Therefore, a desired deceleration can be realized by the brake force that is based on the amount of brake operation in the inertia operation state.

The vehicle deceleration degree in the accelerator-off and clutch-on state (coast deceleration state) varies in accordance with the vehicle speed. In consideration of this point, the threshold value B4 is calculated on the basis of the vehicle speed, whereby more appropriate inertia operation control can be realized.

In a case where the deceleration of the vehicle 10 increases due to a decrease in the amount of brake operation during the non-inertia operation, the actual deceleration A4 is calculated on the basis of the amount of brake operation by the driver. Therefore, appropriate inertia operation control can be performed, with a deceleration request from the driver directly reflected.

In a case where the actual deceleration A4 is determined to be less than the threshold value B4 during the non-inertia operation, and the inertia operation is started, the brake force of the brake device 28 is made greater than the brake force that is based on the amount of brake operation by the driver. Therefore, a sudden change in the deceleration at the time of starting the inertia operation is suppressed, and a deterioration in the drivability can be suppressed.

In the beginning period of the start of the inertia operation, the brake force of the brake device 28 is adjusted on the basis of the drive state of the driven device such as the ISG 13 and the accessories 15 (e.g., electricity generation state of the ISG 13). In this case, the brake control can be performed in consideration of the amount of engine braking obtained immediately before the start of the inertia operation although the amount of engine braking changes depending on the drive state of the driven device. Consequently, a sudden change in the deceleration state of the vehicle 10 can be suppressed, and the drivability can be improved.

The properties XA and XB for use in the calculation of the threshold values B3 and B4 are defined in accordance with the gear ratio of the transmission 17. Therefore, desired inertia operation control can be realized in consideration of even the deceleration state that depends on the gear ratio.

In the respective cases where the inertia operation is terminated during the inertia operation (switch from the clutch-off state to the clutch-on state), and where the inertia operation is started during the normal operation (switch from the clutch-on state to the clutch-off state), the termination and start of the inertia operation are appropriately controlled in consideration of the changes in the deceleration degree of the vehicle 10 that occur in accordance with the switch between the on and off states of the clutch device 16. Consequently, it is possible to appropriately control the timings for the termination and start of the inertia operation and how often the inertia operation is performed.

The threshold value B3 of the deceleration for terminating the inertia operation is less than the threshold value B4 of the deceleration for starting the inertia operation, that is, the threshold value B3 has a smaller deceleration degree. Therefore, when the inertia operation is terminated and started, appropriate inertia operation control can be performed, with the clutch-off property XA and the clutch-on property XB of the vehicle 10 reflected.

Fourth Embodiment

In the fourth embodiment, assuming that the state shifts Y1 to Y4 (refer to FIG. 14) are possible as described in the third embodiment, an influence parameter that exerts an influence on the vehicle deceleration in the accelerator-off state is acquired. Then, at least either the actual deceleration or the threshold value during the inertia operation and the non-inertia operation is corrected on the basis of the influence parameter. The detailed configuration will be described below.

Among the state shifts Y1 to Y4, the state shifts Y1 and Y2 have already been described in the second embodiment (FIG. 13). Therefore, the present embodiment describes the state shifts Y3 and Y4. The description of the inertia operation control is based on the configuration of the third embodiment (FIGS. 16 and 17).

As described above, the influence parameter corresponds to at least either the state of the vehicle or the running environment. More specifically, parameters such as (1) the inclination of a road, (2) the state of a road surface, (3) running resistance, (4) the number of occupants and loaded weight, and (5) temporal change can be used.

Each of the above parameters exerts an influence on the vehicle deceleration. If the value of each parameter corresponds to a value causing a decrease in the deceleration as in the case of the downhill operation, the actual decelerations A3 and A4 and the threshold values B3 and B4 are calculated using the properties XA1 and XB1 (properties having smaller decelerations than the basic properties XA and XB) illustrated in FIG. 12(a). If the value of each parameter corresponds to a value causing an increase in the deceleration as in the case of the uphill operation, the actual decelerations A3 and A4 and the threshold values B3 and B4 are calculated using the properties XA2 and XB2 (properties having larger decelerations than the basic properties XA and XB) illustrated in FIG. 12(b). Using such a computation process, the actual decelerations and the threshold values are corrected.

Figure 26:
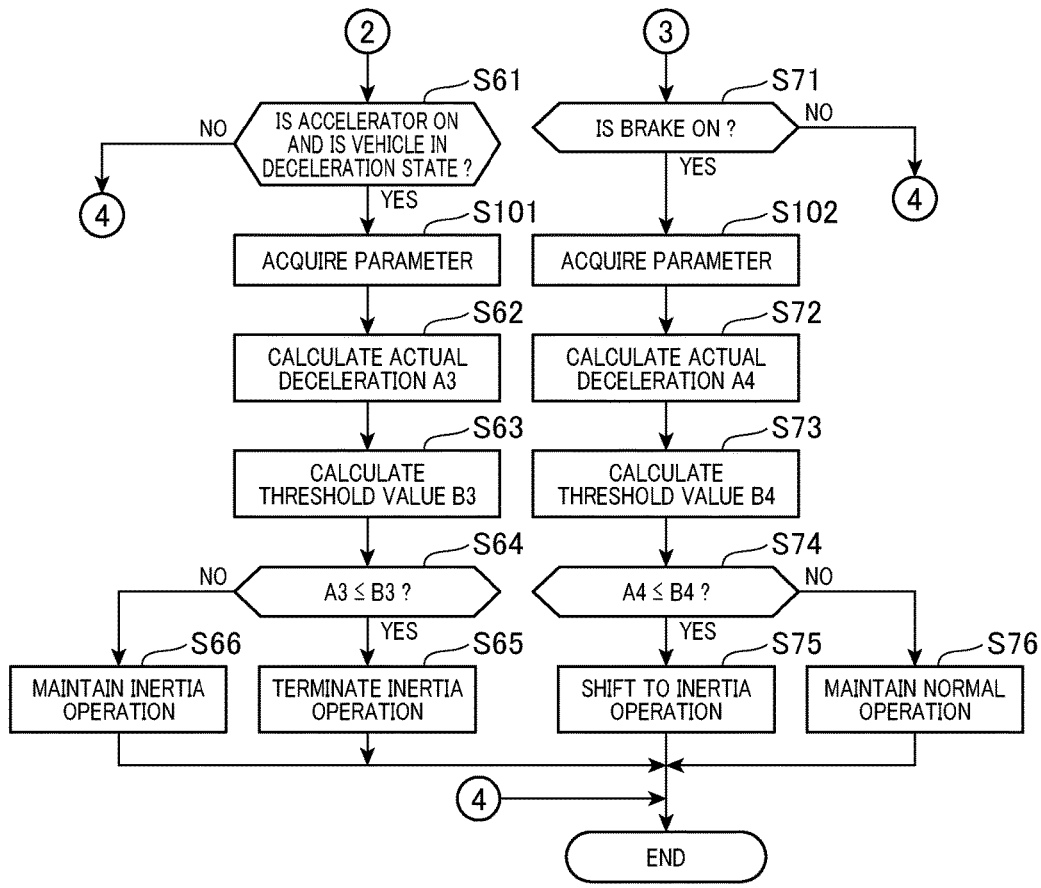
FIG. 26 is a flowchart illustrating a procedure for an inertia operation control process according to a fourth embodiment.

FIG. 26 is a flowchart illustrating a procedure for the inertia operation control process. This process is a substitute for the above-mentioned process of FIG. 17, and repeatedly performed by the engine ECU 31 at predetermined intervals. In FIG. 26, steps similar to those of FIG. 17 are denoted by the same step numbers for ease of explanation. Differences from the process of FIG. 17 are the addition of steps S101 and S102 and changes in the processing details of steps S62, S63, S72, and S73.

In FIG. 26, in a case where the vehicle 10 is in the inertia operation state and in the accelerator-on deceleration state (in the case of YES in step S61, the process advances to step S101). In step S101, at least any of (1) to (5) mentioned above is acquired as the influence parameter.

After that, in step S62, the actual deceleration A3 [m/s2] of the vehicle that occurs in conjunction with an increase in the amount of accelerator operation by the driver is calculated, and the threshold value B3 [m/s2] is calculated in subsequent step S63. At this time, the actual deceleration A3 and the threshold value B3 are calculated in consideration of the fact that the deceleration properties change due to the influence parameter as illustrated in FIGS. 12(a) and 12(b). The influence parameter can also be applied to (correction can be performed on) either the actual deceleration A3 or the threshold value B3. Subsequently, it is determined to terminate or maintain the inertia operation on the basis of the actual deceleration A3 and the threshold value B3 (steps S64 to S66).

In a case where the vehicle 10 is in the normal operation state and in the brake-on state (in the case of YES in step S71), the process advances to step S102. In step S102, at least any of (1) to (5) mentioned above is acquired as the influence parameter. After that, in step S72, the actual deceleration A4 [m/s2] of the vehicle that occurs in conjunction with the driver's brake operation is calculated, and the threshold value B4 [m/s2] is calculated in subsequent step S73. At this time, the actual deceleration A4 and the threshold value B4 are calculated in consideration of the fact that the deceleration properties change due to the influence parameter as illustrated in FIGS. 12(a) and 12(b). The influence parameter can also be applied to (correction can be performed on) either the actual deceleration A4 or the threshold value B4. Subsequently, it is determined to cause the shift to the inertia operation or maintain the normal operation on the basis of the actual deceleration A4 and the threshold value B4 (steps S74 to S76).

According to the above configuration, it is possible to suitably deal with the case where the vehicle deceleration degree varies due to changes in the state of the vehicle 10 or the running environment. Consequently, appropriate inertia operation control can be performed in consideration of the actual usage conditions of the vehicle.

Alternatively, the deceleration deviation from the basis property XA or XB may be calculated on the basis of the influence parameter, and the actual deceleration A3 or A4 and the threshold value B3 or B4 may be corrected on the basis of the deviation.

Fifth Embodiment

Figure 27:
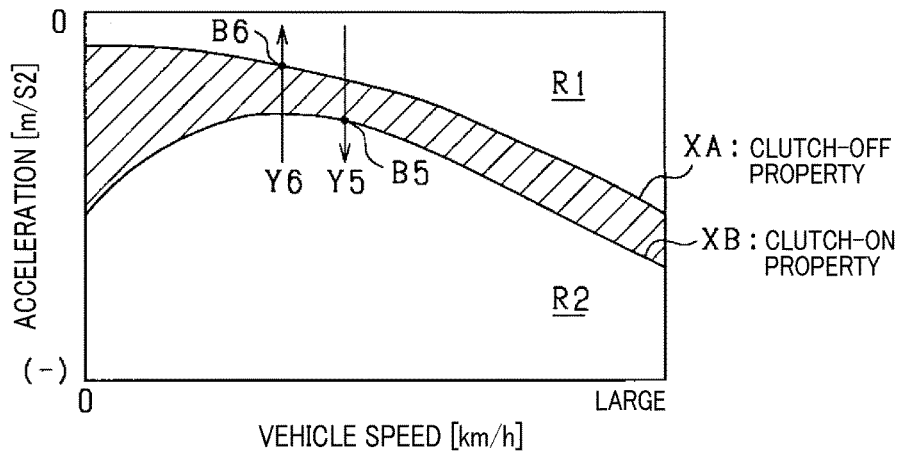
FIG. 27 is a diagram illustrating deceleration properties that depend on the vehicle speed.

In the above-mentioned respective embodiments, as illustrated in FIG. 14, the inertia operation is started when the deceleration degree of the vehicle 10 changes from the outside to the inside of the inertia operation region (range of XA to XB) (Y2 and Y4), and the inertia operation is terminated when the deceleration degree of the vehicle 10 changes from the inside to the outside of the inertia operation region (Y1 and Y3). However, in a case where the brake pedal is pressed down at once or in a case where the accelerator pedal is pressed down in at once in the vehicle deceleration state during the normal operation (non-inertia operation), the deceleration degree is likely to change so as to pass over the inertia operation region. Changes Y5 and Y6 illustrated in FIG. 27 correspond to this situation.

Specifically, Y5 indicates that the amount of brake operation rapidly increases when the deceleration degree is smaller than that of the clutch-off property XA, and that the deceleration degree changes from a region R1 having a smaller deceleration degree than the inertia operation region to a region R2 having a larger deceleration degree than the inertia operation region. In this case, the deceleration degree changes so as to pass over the inertia operation region. Therefore, in the non-inertia vehicle deceleration state, even though the actual deceleration degree of the vehicle 10 exceeds a threshold value defined on the basis of the clutch-off property XA and enters the inertia operation region, the state shift from the normal operation to the inertia operation does not occur.

In addition, Y6 indicates that the amount of accelerator operation rapidly increases when the deceleration degree is larger than that of the clutch-on property XB, and that the deceleration degree changes from the region R2 having a larger deceleration degree than the inertia operation region to the region R1 having a smaller deceleration degree than the inertia operation region. In this case, similarly, the deceleration degree changes so as to pass over the inertia operation region. Therefore, in the non-inertia vehicle deceleration state, even though the actual deceleration degree of the vehicle 10 falls below a threshold value defined on the basis of the clutch-on property XB and enters the inertia operation region, the state shift from the normal operation to the inertia operation does not occur.

In the present embodiment, the engine ECU 31 starts the inertia operation when the vehicle deceleration degree enters the inertia operation region due to, for example, a decrease in the amount of brake operation while the deceleration degree of the vehicle 10 is in the region R1. The engine ECU 31 also starts the inertia operation when the vehicle deceleration degree enters the inertia operation region due to, for example, an increase in the amount of accelerator operation while the deceleration degree of the vehicle 10 is in the region R2.

Figure 28:
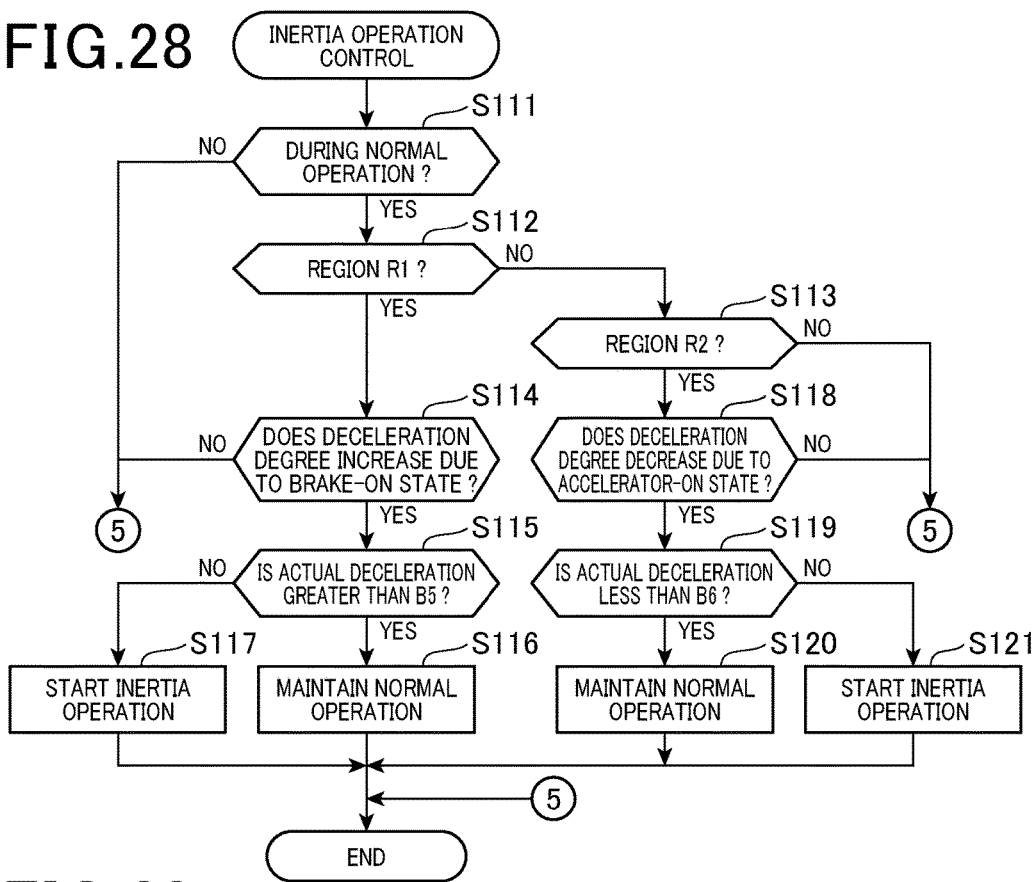
FIG. 28 is a flowchart illustrating a procedure for an inertia operation control process according to a fifth embodiment.

FIG. 28 is a flowchart illustrating a procedure for the inertia operation control process. This process is repeatedly performed by the engine ECU 31 at predetermined intervals. FIG. 28 only illustrates steps corresponding to the state shifts Y5 and Y6, and steps corresponding to the state shifts Y1 to Y4 are performed separately.

In step S111 of FIG. 28, it is determined whether the vehicle 10 is currently in the normal operation (non-inertia operation) state. The process advances to step S112 in the case of YES. In step S112, it is determined whether the vehicle deceleration degree is in the deceleration region R1 of FIG. 27. In step S113, it is determined whether the vehicle deceleration degree is in the deceleration region R2 of FIG. 27. At this time, the process advances to step S114 in the case of YES in step S112, and advances to step S118 in the case of YES in step S113.

Note that it is determined in step S112 that the actual deceleration in the non-inertia operation state is in the region (R1) having a smaller deceleration than the clutch-off property XA, and it is determined in step S113 that the actual deceleration in the non-inertia operation state is in the region (R2) having a larger deceleration than the clutch-on property XB.

In step S114, it is determined whether the deceleration degree of the vehicle 10 increases due to the driver's brake operation. For example, the determination is preferably based on whether the amount of brake operation has increased. The process advances to subsequent step S115 if the deceleration degree increases, and the process is finished here if the deceleration degree does not increase.

In step S115, in the situation where the vehicle deceleration degree increases due to the driver's brake operation, it is determined whether the actual deceleration degree that changes due to the brake operation is greater than a threshold value B5 defined on the basis of the clutch-on property XB. The threshold value B5 is exemplified in FIG. 27, and YES is selected in step S115 if it is determined that the state shift from the region R1 to the region R2 occurs in FIG. 27. The threshold value B5 is preferably obtained on the basis of the amount of brake operation and the vehicle speed.

In the case of YES in step S115, the process advances to step S116, where it is determined to maintain the normal operation. In the case of NO in step S115, the process advances to step S117, where it is determined to start the inertia operation.

In step S118, it is determined whether the deceleration degree of the vehicle 10 decreases due to the driver's accelerator operation. For example, the determination is preferably based on whether the amount of accelerator operation has increased. The process advances to subsequent step S119 if the deceleration degree decreases, and the process is finished here if the deceleration degree does not decrease.

In step S119, in the situation where the vehicle deceleration degree decreases due to the driver's accelerator operation, it is determined whether the actual deceleration degree that changes due to the accelerator operation is less than a threshold value B6 defined on the basis of the clutch-off property XA. The threshold value B6 is exemplified in FIG. 27, and YES is selected in step S119 if it is determined that the state shift from the region R2 to the region R1 occurs in FIG. 27. The threshold value B6 is preferably obtained on the basis of the amount of accelerator operation and the vehicle speed.

In the case of YES in step S119, the process advances to step S120, where it is determined to maintain the normal operation. In the case of NO in step S119, the process advances to step S121, where it is determined to start the inertia operation.

In the above-mentioned fifth embodiment, under the circumstances in which the actual deceleration in the non-inertia operation state is in the region R1 having a smaller deceleration than the inertia operation region, the non-inertia operation is maintained if the brake operation is performed by the driver, and if the actual deceleration degree that changes due to the brake operation is greater than the clutch-on threshold value (B5). In addition, under the circumstances in which the actual deceleration in the non-inertia operation state is in the region R2 having a larger deceleration than the inertia operation region, the non-inertia operation is maintained if the acceleration operation is performed by the driver, and if the actual deceleration degree that changes due to the acceleration operation is less than the clutch-off threshold value (B6).

According to the above configuration, the shift to the inertia operation state can be appropriately performed in accordance with the situation of the driver's brake operation or accelerator operation.

Sixth Embodiment

Figure 29:
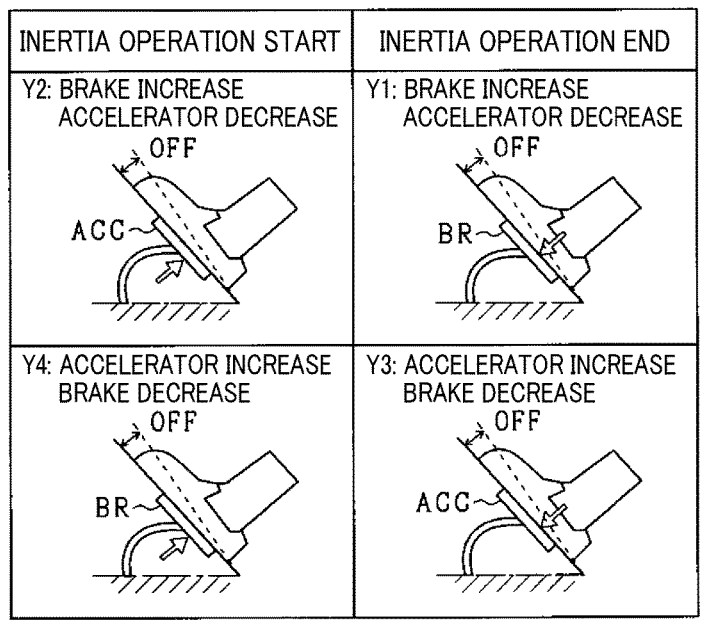
FIG. 29 is a diagram illustrating the relation between the start and termination of the inertia operation and a driver's accelerator operation and brake operation.

The relation between the start and termination of the inertia operation and the driver's accelerator operation and brake operation may be defined as illustrated in FIG. 29. FIG. 29 is partially different from FIG. 15. Refer to FIG. 14 mentioned above for the respective state shifts Y1 to Y4 of FIG. 29.

In FIG. 29, the changes Y1 and Y2 occur in conjunction with an increase in the vehicle deceleration speed. The increase in the vehicle deceleration speed occurs due to an increase in the amount of brake operation by the driver or a decrease in the amount of accelerator operation by the driver. In this regard, the occurrence of the change Y1, that is, the termination of the inertia operation due to the increase in the vehicle deceleration speed, is determined on the basis of either the increase in the amount of brake operation or the decrease in the amount of accelerator operation. Similarly, the occurrence of the change Y2, that is, the start of the inertia operation due to the increase in the vehicle deceleration speed, is determined on the basis of either the increase in the amount of brake operation or the decrease in the amount of accelerator operation.

The changes Y3 and Y4 occur in conjunction with a decrease in the vehicle deceleration speed. The decrease in the vehicle deceleration speed occurs due to an increase in the amount of accelerator operation by the driver or a decrease in the amount of brake operation by the driver. In this regard, the occurrence of the change Y3, that is, the termination of the inertia operation due to the decrease in the vehicle deceleration speed, is determined on the basis of either the increase in the amount of accelerator operation or the decrease in the amount of brake operation. Similarly, the occurrence of the change Y4, that is, the start of the inertia operation due to the decrease in the vehicle deceleration speed, is determined on the basis of either the increase in the amount of accelerator operation or the decrease in the amount of brake operation.

If the vehicle 10 is running on a slope, the deceleration that occurs in the vehicle 10 is affected. In this regard, the conditions for the start and termination of the inertia operation are expanded, whereby the start and termination of the inertia operation can be appropriately performed in consideration of the influence of the slope operation on the vehicle deceleration.

For example, in a case where the vehicle 10 is running on a downhill slope, it is considered that a factor causing a decrease in the vehicle deceleration occurs, and the vehicle 10 is not likely to be decelerated. In such a case, it is preferable that the inertia operation be started when the actual deceleration increases due to an increase in the amount of brake operation by the driver during the non-inertia operation (corresponding to Y2). It is also preferable that the inertia operation be terminated when the actual deceleration decreases due to a decrease in the amount of brake operation by the driver during the inertia operation (corresponding to Y3).

In a case where the vehicle 10 is running on an uphill slope, it is considered that a factor causing an increase in the vehicle deceleration occurs, and the vehicle 10 is likely to be decelerated. In such a case, it is preferable that the inertia operation be started when the actual deceleration decreases due to an increase in the amount of accelerator operation by the driver during the non-inertia operation (corresponding to Y4). It is also preferable that the inertia operation be terminated when the actual deceleration increases due to a decrease in the amount of accelerator operation by the driver during the inertia operation (corresponding to Y1).

The engine ECU 31 performs the inertia operation control in order to realize the above-mentioned state shifts Y1 to Y4. In this case, the following processes are preferably added to the inertia operation control described with reference to FIGS. 16 and 17.

(a) During the inertia operation, the inertia operation is terminated if the actual deceleration calculated on the basis of the amount of accelerator operation (amount of accelerator decreasing operation) and the vehicle speed is determined to be greater than a threshold value calculated on the basis of the clutch-on property XB, and the inertia operation is maintained if the actual deceleration degree is determined to be less than the threshold value (corresponding to Y1).

(b) During the non-inertia operation, the inertia operation is started if the actual deceleration calculated on the basis of the amount of brake operation (amount of brake increasing operation) is determined to be greater than a threshold value calculated on the basis of the clutch-off property XA, and the non-inertia operation is maintained if the actual deceleration degree is determined to be less than the threshold value (corresponding to Y2).

(c) During the inertia operation, the inertia operation is terminated if the actual deceleration calculated on the basis of the amount of brake operation (amount of brake decreasing operation) is determined to be less than a threshold value calculated on the basis of the clutch-off property XA, and the inertia operation is maintained if the actual deceleration degree is determined to be greater than the threshold value (corresponding to Y3).

(d) During the non-inertia operation, the inertia operation is started if the actual deceleration calculated on the basis of the amount of accelerator operation (amount of accelerator increasing operation) is determined to be less than a threshold value calculated on the basis of the clutch-on property XB, and the non-inertia operation is maintained if the actual deceleration degree is determined to be greater than the threshold value (corresponding to Y4).

In the present embodiment, as in the case of the above-mentioned embodiments, it is possible to prevent the inertia operation from being turned on and off (switched) frequently, and expect an improvement in the fuel efficiency and an improvement in the drivability. As a result, appropriate inertia operation control can be realized.

Alternatively, the engine ECU 31 may determine that the vehicle 10 is running on a slope, and determine whether the slope is a downhill slope or an uphill slope, and the above processes (a) to (d) may be performed on the basis of the determination result.

Other Embodiments

The above-mentioned embodiments may be changed in the following manner, for example.

Figure 30:
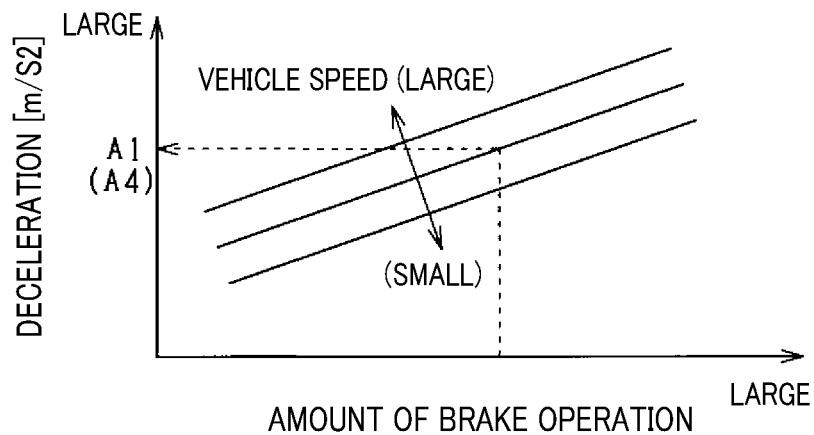
FIG. 30 is a diagram illustrating the relation between the amount of brake operation, the vehicle speed, and the deceleration.

The actual decelerations A1 and A4 that occur in conjunction with the driver's brake operation may be calculated using the relation of FIG. 30. In FIG. 30, the relation between the amount of brake operation, the vehicle speed, and the deceleration is defined. According to this relation, the values that are calculated as the actual decelerations A1 and A4 increase as the amount of brake operation increases or as the vehicle speed increases. The same applies to the processes that are performed on the basis of FIG. 29.

Figure 31:
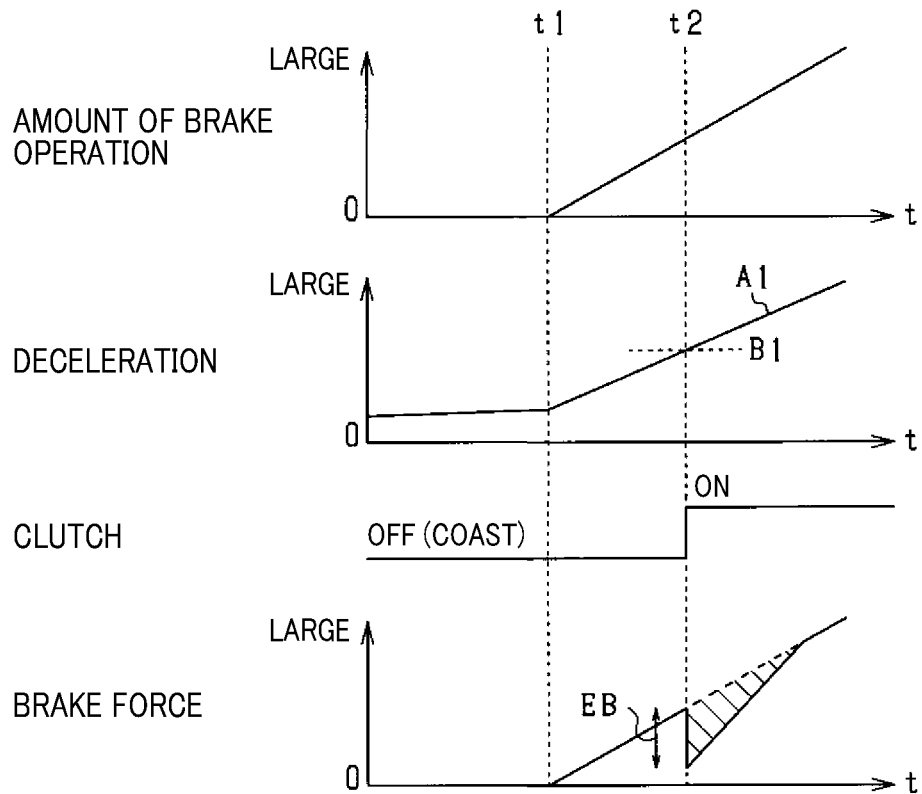
FIG. 31 is a time chart illustrating in detail the brake control for terminating the inertia operation.

In the first embodiment, the brake force of the brake device 28 is restricted when the inertia operation is terminated in response to an increase in the amount of brake operation by the driver during the inertia operation of the vehicle 10 (refer to FIG. 8). This configuration can be changed in the following manner. Specifically, as illustrated in FIG. 31, the amount of restriction on the brake force (hatched part in the drawing) is gradually reduced as time elapses after the termination of the inertia operation. In this case, a sudden change in the deceleration at the time of terminating the inertia operation can be suppressed while the brake force is only temporarily restricted. Consequently, a deterioration in the drivability is suppressed, and the deceleration of the vehicle 10 can become moderately dependent on the driver's brake operation instead of being dependent on the brake control after the inertia operation is terminated.

In a case where the generation of regenerative electric power is performed by the ISG 13 as illustrated in FIG. 10, the amount of restriction on the brake force can be gradually reduced as time elapses after the termination of the inertia operation.

Figure 32:
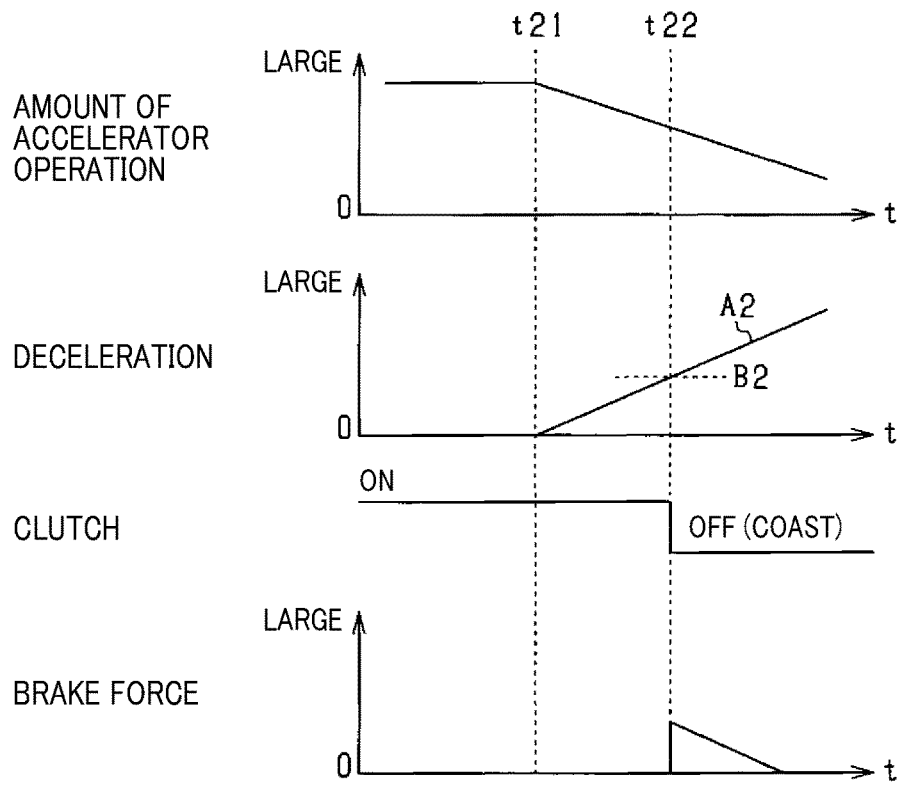
FIG. 32 is a time chart illustrating in detail the brake control for starting the inertia operation.

The brake force of the brake device 28 is applied when the inertia operation is started in response to a decrease in the amount of accelerator operation by the driver during the non-inertia operation of the vehicle 10 (refer to FIG. 11). However, this configuration can be changed in the following manner. Specifically, as illustrated in FIG. 32, the amount of brake assist is gradually reduced as time elapses after the start of the inertia operation. In this case, a sudden change in the deceleration at the time of starting the inertia operation can be suppressed while the brake force (brake assist) is only temporarily applied. Consequently, a deterioration in the drivability is suppressed, and the deceleration of the vehicle 10 can become moderately dependent on the driver's accelerator operation instead of being dependent on the brake assist after the inertia operation is started.

In the second and fourth embodiments, the direction of wind may be included as the influence parameter. Specifically, whether a tailwind is blowing or a headwind is blowing with respect to the traveling direction of the vehicle is used as the influence parameter. In this case, the tailwind corresponds to a factor causing a decrease in the vehicle deceleration, and the headwind corresponds to a factor causing an increase in the vehicle deceleration. The speed of wind can also be included as the influence parameter.

In the second and fourth embodiments, the influence parameter may be obtained in the following manner. Specifically, the engine ECU 31 acquires, as the influence parameter causing a decrease or increase in the vehicle deceleration degree, the deviation between the reference deceleration degree obtained on the basis of the amount of accelerator or brake operation and the vehicle speed and the actual deceleration degree obtained using information on the measured speed.

Figure 33:
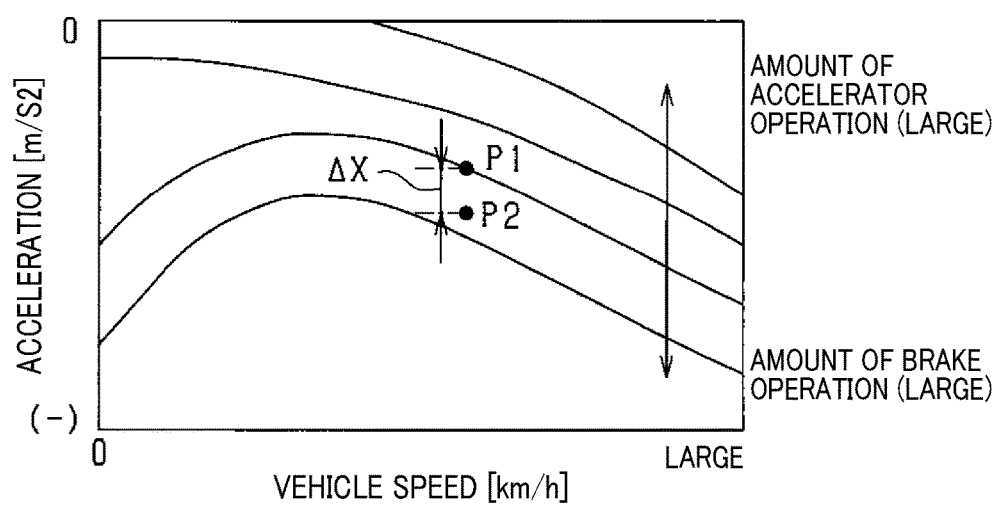
FIG. 33 is a diagram illustrating a correlation map that defines the reference deceleration degree.

More specifically, the relation of FIG. 33 is determined as a correlation map that defines the reference deceleration degree under the reference operational conditions of the vehicle 10. This relation is defined as the relation between the vehicle speed, the amount of accelerator operation, the amount of brake operation, and the acceleration (deceleration), assuming that the reference operational conditions include, for example, a flat surface (at an incline of 0 degree), a speed of wind of zero, a new-car state (initial value of the vehicle running resistance), a loaded weight of zero, and one occupant. Then, the engine ECU 31 acquires the deviation $\Delta X$ between the reference deceleration (e.g., P1 of FIG. 33) obtained from the respective conditions on the correlation map and the measured vehicle deceleration (e.g., P2 of FIG. 33). The engine ECU 31 also corrects the threshold value B1 (or threshold value B4) calculated using the clutch-on property XB and the threshold value B2 (or threshold value B3) calculated using the clutch-off property XA on the basis of the deviation $\Delta X$. Alternatively, the actual decelerations A1 to A4 can be corrected on the basis of the deviation $\Delta X$ in addition to or instead of the respective threshold values B1 to B4. The measured value of the vehicle deceleration is preferably obtained using a detection value of an accelerator sensor or a derivative value of a detection value of the vehicle speed sensor. The deviation $\Delta X$ is preferably obtained while the vehicle 10 is not performing the inertia operation.

According to the present configuration, the start and termination of the inertia operation can be appropriately controlled in consideration of the deviation $\Delta X$ of the deceleration that actually occurs during use of the vehicle 10, that is, the deviation from the reference value that occurs due to various conditions at each time.

In the above-mentioned embodiments, the threshold values B1 and B4 are calculated as the decelerations on the clutch-on property XB, and the threshold values B2 and B3 are calculated as the decelerations on the clutch-off property XA. This configuration may be changed so that the threshold values B1 to B4 are calculated as values smaller or larger than the property XA or XB. Specifically, the threshold values B1 and B4 only need to be determined on the basis of the clutch-on property XB, and the threshold values B2 and B3 only need to be determined on the basis of the clutch-off property XA.

In a case where a multistage transmission having a plurality of gear stages (shift positions) is used as the transmission, the clutch-off property XA and the clutch-on property XB are preferably defined in consideration of the gear stages of the multistage transmission. For example, it is preferable that a plurality of properties XA and XB be defined in association with the respective gear stages.

In the above-mentioned embodiments, the actual decelerations A1 and A4 are calculated as the actual deceleration degrees in the coast deceleration state on the basis of the amount of brake operation which is the amount of pressing the brake pedal. This configuration may be changed. For example, the actual decelerations A1 and A4 may be calculated on the basis of the pressurizing force (brake hydraulic pressure of the brake device 28) that occurs in conjunction with the driver's brake operation or the speed of pressing the brake pedal, instead of or in addition to the amount of brake operation. In this case, the actual decelerations A1 and A4 only need to be calculated on the basis of the execution mode of the brake operation.

In addition, the execution mode of the accelerator operation may be determined using a parameter other than the amount of accelerator operation that is the amount of pressing the accelerator pedal, and the actual decelerations A2 and A3 may be calculated on the basis of the execution mode. For example, the actual decelerations A2 and A3 are calculated on the basis of the length of time that has elapsed since the start of a decrease in the amount of accelerator operation.

The actual deceleration degree of the vehicle in the coast deceleration state may be calculated without using a parameter related to the driver's brake operation. For example, the actual deceleration degree is calculated on the basis of a decreasing change in the vehicle speed during the inertia operation of the vehicle. In this case, the actual deceleration is calculated using a derivative value of the actual vehicle speed detected by the vehicle speed sensor 43, and the actual deceleration is compared with a predetermined threshold value.

In addition, the actual deceleration degree of the vehicle in the non-coast deceleration state may be calculated without using a parameter related to the driver's accelerator operation. For example, the actual deceleration degree is calculated on the basis of a decreasing change in the vehicle speed during the normal operation of the vehicle. In this case, the actual deceleration is calculated using a derivative value of the actual vehicle speed detected by the vehicle speed sensor 43, and the actual deceleration is compared with a predetermined threshold value.

During the inertia operation, the computation process for terminating the inertia operation based on the comparison between the actual deceleration A1 and the threshold value B1 and the computation process for terminating the inertia operation only based on the execution of the brake operation without performing the comparison may be switchably performed. During the non-inertia operation, the computation process for starting the inertia operation based on the comparison between the actual deceleration A2 and the threshold value B2 and the computation process for starting the inertia operation only based on the termination of the accelerator operation without performing the comparison may be switchably performed.

Furthermore, during the inertia operation, the computation process for terminating the inertia operation based on the comparison between the actual deceleration A3 and the threshold value B3 and the computation process for terminating the inertia operation only based on the execution of the accelerator operation without performing the comparison may be switchably performed. During the non-inertia operation, the computation process for starting the inertia operation based on the comparison between the actual deceleration A4 and the threshold value B4 and the computation process for starting the inertia operation only based on the termination of the brake operation without performing the comparison may be switchably performed.

In the above-mentioned embodiments, it is determined to cause the shift from the normal operation to the inertia operation and the shift from the inertia operation to the normal operation on the basis of the results of comparison between the actual decelerations A1 to A4 of the vehicle and the threshold values B1 to B4. This configuration may be changed. For example, the actual decelerations A1 and A4 and the threshold values B1 and B1 are respectively replaced with the actual amount of brake operation and an operation amount threshold value, and the actual amount of brake operation is compared with the operation amount threshold value. Alternatively, the actual decelerations A2 and A3 and the threshold values B2 and B3 are respectively replaced with the actual amount of accelerator operation and an operation amount threshold value, and the actual amount of accelerator operation is compared with the operation amount threshold value.

In the above-mentioned embodiments, in the respective cases where the inertia operation is terminated during the inertia operation, and where the inertia operation is started during the normal operation, the termination and start of the inertia operation are controlled in consideration of the changes in the vehicle speed degree that occur in accordance with the switch between the on and off states of the clutch device 16. However, this configuration may be changed so that only either the control for terminating the inertia operation during the inertia operation or the control for starting the inertia operation during the normal operation is performed.

REFERENCE SIGN LIST

10 . . . Vehicle, 11 . . . Engine, 12 . . . Engine output shaft, 16 . . . Clutch device, 31 . . . Engine ECU (Vehicle control device).

What is claimed is:

1. A vehicle control device configured to be applied to a vehicle including an engine configured to serve as a motive power source and a clutch device provided on a power transmission path leading to an output shaft of the engine, wherein
   the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and
   the vehicle control device comprises:
   a deceleration degree calculating means configured to calculate an actual deceleration degree that is a deceleration degree of the vehicle in a vehicle deceleration state during the inertia operation;
   a determination means configured to determine whether the actual deceleration degree calculated by the deceleration degree calculating means is greater than a threshold value defined on the basis of a deceleration degree of the vehicle in such a state that no accelerator operation is performed and the clutch device is connected; and
   an operation control means configured to terminate the inertia operation if the actual deceleration degree is determined to be greater than the threshold value, and maintain the inertia operation if the actual deceleration degree is determined to be less than the threshold value.

2. The vehicle control device according to claim 1, wherein
   in the vehicle, correlation data indicating a correlation between a vehicle deceleration degree and a vehicle speed in such a state that no accelerator operation is performed and the clutch device is connected is defined in advance, the vehicle control device includes a threshold value calculating means configured to calculate, as the threshold value in the vehicle deceleration state during the inertia operation, the vehicle deceleration degree correlated with a current vehicle speed, and the determination means determines whether the actual deceleration degree is greater than the threshold value calculated by the threshold value calculating means.

3. The vehicle control device according to claim 1, wherein the deceleration degree calculating means calculates the actual deceleration degree based on an execution mode of brake operation when the vehicle is decelerated due to the brake operation during the inertia operation.

4. The vehicle control device according to claim 1, comprising:

an acquisition means configured to acquire an influence parameter corresponding to at least either a state of the vehicle or a running environment and exerting an influence on the vehicle deceleration degree in such a state that no accelerator operation is performed; and a correction means configured to correct at least either the actual deceleration degree or the threshold value based on the influence parameter acquired by the acquisition means, wherein the determination means compares the actual deceleration degree and the threshold value using the actual deceleration degree and the threshold value corrected by the correction means.

5. The vehicle control device according to claim 4, wherein the acquisition means acquires, as the influence parameter causing a decrease or increase in the vehicle deceleration degree, a deviation between a reference deceleration degree obtained on the basis of the amount of accelerator or brake operation and the vehicle speed and a measured deceleration degree obtained using information on a measured speed.

6. The vehicle control device according to claim 1, configured to be applied to the vehicle including a brake device configured to generate brake force in accordance with an amount of brake operation by a driver, wherein the vehicle control device includes a brake control means configured to restrict the brake force of the brake device in the beginning of termination of the inertia operation in a case where the actual deceleration degree is determined to be greater than the threshold value during the inertia operation, and the inertia operation is terminated.

7. The vehicle control device according to claim 6, configured to be applied to the vehicle including a driven device configured to be driven by rotation of the output shaft of the engine, wherein the brake control means adjusts to what extent the brake force of the brake device is restricted based on a drive state of the driven device in the beginning of the termination of the inertia operation.

8. The vehicle control device according to claim 7, wherein the driven device includes an electricity generation device configured to generate electricity using the rotation of the output shaft of the engine, and the brake control means adjusts to what extent the brake force of the brake device is restricted based on an electricity generation state of the electricity generation device in the beginning of the termination of the inertia operation.

9. A vehicle control device configured to be applied to a vehicle including an engine configured to serve as a motive power source and a clutch device provided on a power transmission path leading to an output shaft of the engine, wherein the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and the vehicle control device comprises:

a deceleration degree calculating means configured to calculate an actual deceleration degree that is a deceleration degree of the vehicle in a vehicle deceleration state during non-inertia operation;

a determination means configured to determine whether the actual deceleration degree calculated by the deceleration degree calculating means is greater than a threshold value defined on the basis of a deceleration degree of the vehicle in such a state that no accelerator operation is performed and the clutch device is shut off; and an operation control means configured to start the inertia operation if the actual deceleration degree is determined to be greater than the threshold value, and maintain the non-inertia operation if the actual deceleration degree is determined to be less than the threshold value.

10. The vehicle control device according to claim 9, wherein in the vehicle, correlation data indicating a correlation between a vehicle deceleration degree and a vehicle speed in such a state that no accelerator operation is performed and the clutch device is shut off is defined in advance, the vehicle control device includes a threshold value calculating means configured to calculate, as the threshold value in the vehicle deceleration state during the non-inertia operation, the vehicle deceleration degree correlated with a current vehicle speed, and the determination means determines whether the actual deceleration degree is greater than the threshold value calculated by the threshold value calculating means.

11. The vehicle control device according to claim 9, wherein the deceleration degree calculating means calculates the actual deceleration degree based on an execution mode of accelerator operation when the vehicle is decelerated due to a decrease in the accelerator operation during the non-inertia operation.

12. The vehicle control device according to claim 9, comprising:

an acquisition means configured to acquire an influence parameter corresponding to at least either a state of the vehicle or a running environment and exerting an influence on the vehicle deceleration degree in such a state that no accelerator operation is performed; and a correction means configured to correct at least either the actual deceleration degree or the threshold value based on the influence parameter acquired by the acquisition means, wherein the determination means compares the actual deceleration degree and the threshold value using the actual deceleration degree and the threshold value corrected by the correction means.

13. The vehicle control device according to claim 9, configured to be applied to the vehicle including a brake device configured to generate brake force in accordance with an amount of brake operation by a driver, wherein
the vehicle control device includes a brake control means configured to cause the brake device to generate the brake force in the beginning of start of the inertia operation, regardless of the brake operation by the driver, in a case where the actual deceleration degree is determined to be greater than the threshold value during the non-inertia operation, and the inertia operation is started.

14. The vehicle control device according to claim 13, configured to be applied to the vehicle including a driven device configured to be driven by rotation of the output shaft of the engine, wherein
the brake control means adjusts the brake force of the brake device based on a drive state of the driven device in the beginning of the start of the inertia operation.

15. A vehicle control device configured to be applied to a vehicle including an engine configured to serve as a motive power source and a clutch device provided on a power transmission path leading to an output shaft of the engine, wherein
the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and
the vehicle control device comprises:
a first deceleration degree calculating means configured to calculate a first actual deceleration degree that is a deceleration degree of the vehicle in a vehicle deceleration state during the inertia operation;
a first determination means configured to determine whether the first actual deceleration degree calculated by the first deceleration degree calculating means is greater than a clutch-on threshold value defined on the basis of a deceleration degree of the vehicle in such a state that no accelerator operation is performed and the clutch device is connected;
a first operation control means configured to terminate the inertia operation if the first actual deceleration degree is determined to be greater than the clutch-on threshold value, and maintain the inertia operation if the first actual deceleration degree is determined to be less than the clutch-on threshold value;
a second deceleration degree calculating means configured to calculate a second actual deceleration degree that is a deceleration degree of the vehicle in a vehicle deceleration state during non-inertia operation;
a second determination means configured to determine whether the second actual deceleration degree calculated by the second deceleration degree calculating means is greater than a clutch-off threshold value defined on the basis of a deceleration degree of the vehicle in such a state that no accelerator operation is performed and the clutch device is shut off; and
a second operation control means configured to start the inertia operation if the second actual deceleration degree is determined to be greater than the clutch-off threshold value, and maintain the non-inertia operation if the second actual deceleration degree is determined to be less than the clutch-off threshold value.

16. The vehicle control device according to claim 15, wherein
in the vehicle, clutch-on correlation data indicating a correlation between a vehicle deceleration degree and a vehicle speed in such a state that no accelerator operation is performed and the clutch device is connected and clutch-off correlation data indicating a correlation between a vehicle deceleration degree and a vehicle speed in such a state that no accelerator operation is performed and the clutch device is shut off are defined in advance,
the vehicle control device includes:
a first threshold value calculating means configured to calculate, as the clutch-on threshold value in the vehicle deceleration state during the inertia operation, the vehicle deceleration degree correlated with a current vehicle speed using the clutch-on correlation data; and
a second threshold value calculating means configured to calculate, as the clutch-off threshold value in the vehicle deceleration state during the non-inertia operation, the vehicle deceleration degree correlated with a current vehicle speed using the clutch-off correlation data, and
the clutch-on threshold value is calculated as a value having a larger deceleration degree than the clutch-off threshold value.

17. The vehicle control device according to claim 15, comprising:
a third determination means configured to determine whether brake operation is performed by a driver and whether an actual deceleration degree that changes due to the brake operation is greater than the clutch-on threshold value in a case where the second actual deceleration degree is less than a clutch-off property value defined on the basis of the deceleration degree of the vehicle in such a state that no accelerator operation is performed and the clutch device is shut off; and
a third operation control means configured to maintain the non-inertia operation if the actual deceleration degree that changes due to the brake operation is determined to be greater than the clutch-on threshold value.

18. A vehicle control device configured to be applied to a vehicle including an engine configured to serve as a motive power source and a clutch device provided on a power transmission path leading to an output shaft of the engine, wherein
the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and
the vehicle control device comprises:
a deceleration degree calculating means configured to calculate an actual deceleration degree that is a deceleration degree of the vehicle in a vehicle deceleration state during the inertia operation;
a determination means configured to determine whether the actual deceleration degree calculated by the deceleration degree calculating means is less than a threshold value defined on the basis of a deceleration degree of the vehicle in such a state that no accelerator operation is performed and the clutch device is shut off; and an operation control means configured to terminate the inertia operation if the actual deceleration degree is determined to be less than the threshold value, and maintain the inertia operation if the actual deceleration degree is determined to be greater than the threshold value.

19. The vehicle control device according to claim 18, wherein in the vehicle, correlation data indicating a correlation between a vehicle deceleration degree and a vehicle speed in such a state that no accelerator operation is performed and the clutch device is shut off is defined in advance, the vehicle control device includes a threshold value calculating means configured to calculate, as the threshold value in the vehicle deceleration state during the inertia operation, the vehicle deceleration degree correlated with a current vehicle speed, and the determination means determines whether the actual deceleration degree is less than the threshold value calculated by the threshold value calculating means.

20. The vehicle control device according to claim 18, wherein the deceleration degree calculating means calculates the actual deceleration degree based on an execution mode of accelerator operation when the deceleration degree of the vehicle decreases due to an increase in an amount of accelerator operation during the inertia operation.

21. The vehicle control device according to claim 18, comprising:

an acquisition means configured to acquire an influence parameter corresponding to at least either a state of the vehicle or a running environment and exerting an influence on the vehicle deceleration degree in such a state that no accelerator operation is performed; and a correction means configured to correct at least either the actual deceleration degree or the threshold value based on the influence parameter acquired by the acquisition means, wherein the determination means compares the actual deceleration degree and the threshold value using the actual deceleration degree and the threshold value corrected by the correction means.

22. The vehicle control device according to claim 18, configured to be applied to the vehicle including a rotating electrical machine configured to apply rotary torque to the output shaft of the engine, wherein the vehicle control device includes a torque control means configured to cause the rotating electrical machine to apply torque in the beginning of termination of the inertia operation in a case where the actual deceleration degree is determined to be less than the threshold value during the inertia operation, and the inertia operation is terminated.

23. The vehicle control device according to claim 22, wherein the torque control means adjusts to what extent the torque is applied by the rotating electrical machine based on to what extent engine braking occurs in conjunction with connection of the clutch device in the beginning of the termination of the inertia operation.

24. A vehicle control device configured to be applied to a vehicle including an engine configured to serve as a motive power source and a clutch device provided on a power transmission path leading to an output shaft of the engine, wherein the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and the vehicle control device comprises:

a deceleration degree calculating means configured to calculate an actual deceleration degree that is a deceleration degree of the vehicle in a vehicle deceleration state during non-inertia operation;

a determination means configured to determine whether the actual deceleration degree calculated by the deceleration degree calculating means is less than a threshold value defined on the basis of a deceleration degree of the vehicle in such a state that no accelerator operation is performed and the clutch device is connected; and an operation control means configured to start the inertia operation if the actual deceleration degree is determined to be less than the threshold value, and maintain the non-inertia operation if the actual deceleration degree is determined to be greater than the threshold value.

25. The vehicle control device according to claim 24, wherein in the vehicle, correlation data indicating a correlation between a vehicle deceleration degree and a vehicle speed in such a state that no accelerator operation is performed and the clutch device is connected is defined in advance, the vehicle control device includes a threshold value calculating means configured to calculate, as the threshold value in the vehicle deceleration state during the non-inertia operation, the vehicle deceleration degree correlated with a current vehicle speed, and the determination means determines whether the actual deceleration degree is less than the threshold value calculated by the threshold value calculating means.

26. The vehicle control device according to claim 24, wherein the deceleration degree calculating means calculates the actual deceleration degree based on an execution mode of brake operation when the deceleration degree of the vehicle decreases due to a decrease in an amount of brake operation during the non-inertia operation.

27. The vehicle control device according to claim 24, comprising:

an acquisition means configured to acquire an influence parameter corresponding to at least either a state of the vehicle or a running environment and exerting an influence on the vehicle deceleration degree in such a state that no accelerator operation is performed; and a correction means configured to correct at least either the actual deceleration degree or the threshold value based on the influence parameter acquired by the acquisition means, wherein the determination means compares the actual deceleration degree and the threshold value using the actual deceleration degree and the threshold value corrected by the correction means.

28. The vehicle control device according to claim 24, configured to be applied to the vehicle including a brake device configured to generate brake force in accordance with the amount of brake operation by a driver, wherein the vehicle control device includes a brake control means configured to make the brake force of the brake device greater than brake force that is based on the amount of brake operation by the driver in the beginning of start of the inertia operation in a case where the actual deceleration degree is determined to be less than the threshold value during the non-inertia operation, and the inertia operation is started.

29. The vehicle control device according to claim 28, configured to be applied to the vehicle including a driven device configured to be driven by rotation of the output shaft of the engine, wherein the brake control means adjusts the brake force of the brake device based on a drive state of the driven device in the beginning of the start of the inertia operation.

30. The vehicle control device according to claim 29, wherein the driven device includes an electricity generation device configured to generate electricity using the rotation of the output shaft of the engine, and the brake control means adjusts the brake force of the brake device based on an electricity generation state of the electricity generation device in the beginning of the start of the inertia operation.

31. A vehicle control device configured to be applied to a vehicle including an engine configured to serve as a motive power source and a clutch device provided on a power transmission path leading to an output shaft of the engine, wherein the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and the vehicle control device comprises:

a first deceleration degree calculating means configured to calculate a first actual deceleration degree that is a deceleration degree of the vehicle in a vehicle deceleration state during the inertia operation;

a first determination means configured to determine whether the first actual deceleration degree calculated by the first deceleration degree calculating means is less than a clutch-off threshold value defined on the basis of a deceleration degree of the vehicle in such a state that no accelerator operation is performed and the clutch device is shut off;

a first operation control means configured to terminate the inertia operation if the first actual deceleration degree is determined to be less than the clutch-off threshold value, and maintain the inertia operation if the first actual deceleration degree is determined to be greater than the clutch-off threshold value;

a second deceleration degree calculating means configured to calculate a second actual deceleration degree that is a deceleration degree of the vehicle in a vehicle deceleration state during non-inertia operation;

a second determination means configured to determine whether the second actual deceleration degree calculated by the second deceleration degree calculating means is less than a clutch-on threshold value defined on the basis of a deceleration degree of the vehicle in such a state that no accelerator operation is performed and the clutch device is connected; and a second operation control means configured to start the inertia operation if the second actual deceleration degree is determined to be less than the clutch-on threshold value, and maintain the non-inertia operation if the second actual deceleration degree is determined to be greater than the clutch-on threshold value.

32. The vehicle control device according to claim 31, wherein in the vehicle, clutch-off correlation data indicating a correlation between a vehicle deceleration degree and a vehicle speed in such a state that no accelerator operation is performed and the clutch device is shut off and clutch-on correlation data indicating a correlation between a vehicle deceleration degree and a vehicle speed in such a state that no accelerator operation is performed and the clutch device is connected are defined in advance, the vehicle control device includes:

a first threshold value calculating means configured to calculate, as the clutch-off threshold value in the vehicle deceleration state during the inertia operation, the vehicle deceleration degree correlated with a current vehicle speed using the clutch-off correlation data; and a second threshold value calculating means configured to calculate, as the clutch-on threshold value in the vehicle deceleration state during the non-inertia operation, the vehicle deceleration degree correlated with a current vehicle speed using the clutch-on correlation data, and the clutch-off threshold value is calculated as a value having a smaller deceleration degree than the clutch-on threshold value.

33. The vehicle control device according to claim 31, comprising:

a third determination means configured to determine whether accelerator operation is performed by a driver and whether an actual deceleration degree that changes due to the accelerator operation is less than the clutch-off threshold value in a case where the second actual deceleration degree is greater than a clutch-on property value defined on the basis of the deceleration degree of the vehicle in such a state that no accelerator operation is performed and the clutch device is connected; and a third operation control means configured to maintain the non-inertia operation if the actual deceleration degree that changes due to the accelerator operation is determined to be less than the clutch-off threshold value.

34. A vehicle control device configured to be applied to a vehicle including an engine configured to serve as a motive power source and a clutch device provided on a power transmission path leading to an output shaft of the engine, wherein the vehicle control device puts the clutch device into a shut-off state to put the vehicle into an inertia operation state in response to a predetermined executing condition being met, and puts the clutch device into a connection state to terminate the inertia operation state in response to a predetermined terminating condition being met during inertia operation, and the vehicle control device comprises:

a deceleration degree calculating means configured to calculate an actual deceleration degree that is a deceleration degree of the vehicle in a vehicle deceleration state;

a first determination means configured to define an inertia operation region between a clutch-on property value and a clutch-off property value, and determine to start the inertia operation when the actual deceleration degree calculated by the deceleration degree calculating means changes from an outside to an inside of the inertia operation region, the clutch-on property value being defined on the basis of a deceleration degree of the vehicle in such a state that no accelerator operation is performed and the clutch device is connected, the clutch-off property value being defined on the basis of a deceleration degree of the vehicle in such a state that no accelerator operation is performed and the clutch device is shut off; and a second determination means configured to determine to terminate the inertia operation when the actual deceleration degree calculated by the deceleration degree calculating means changes from the inside to the outside of the inertia operation region.

35. The vehicle control device according to claim 34, wherein the first determination means determines to start the inertia operation when the actual deceleration degree changes from the outside to the inside of the inertia operation region due to a decrease in an amount of accelerator operation or when the actual deceleration degree changes from the outside to the inside of the inertia operation region due to a decrease in an amount of brake operation, and the second determination means determines to terminate the inertia operation when the actual deceleration degree changes from the inside to the outside of the inertia operation region due to an increase in the amount of brake operation or when the actual deceleration degree changes from the inside to the outside of the inertia operation region due to an increase in the amount of accelerator operation.

* * * * *